US009607390B2

(12) United States Patent
Heggelund et al.

(10) Patent No.: US 9,607,390 B2
(45) Date of Patent: Mar. 28, 2017

(54) RASTERIZATION IN GRAPHICS PROCESSING SYSTEM

(71) Applicant: ARM LIMITED, Cambridge (GB)

(72) Inventors: Frode Heggelund, Trondheim (NO); Mukesh Haresh Lahori, Trondheim (NO)

(73) Assignee: ARM Limited, Cambridge (GB)

( * ) Notice: Subject to any disclaimer, the term of this patent is extended or adjusted under 35 U.S.C. 154(b) by 57 days.

(21) Appl. No.: 14/511,540

(22) Filed: Oct. 10, 2014

(65) Prior Publication Data

US 2015/0130798 A1    May 14, 2015

(30) Foreign Application Priority Data

Nov. 11, 2013  (GB) .................................. 1319834.6

(51) Int. Cl.
  *G06T 15/00*  (2011.01)
  *G06T 7/00*  (2017.01)
(52) U.S. Cl.
  CPC .......... *G06T 7/0051* (2013.01); *G06T 15/005* (2013.01)
(58) Field of Classification Search
  None
  See application file for complete search history.

(56) References Cited

U.S. PATENT DOCUMENTS

| | | | |
|---|---|---|---|
| 6,552,725 B1 | 4/2003 | Houtman et al. | |
| 7,119,809 B1* | 10/2006 | McCabe | G06T 11/40 345/422 |
| 8,228,328 B1* | 7/2012 | French | G06T 15/40 345/421 |
| 2004/0246251 A1* | 12/2004 | Fenney | G06T 11/40 345/426 |
| 2006/0066613 A1 | 3/2006 | Elshishiny | |
| 2013/0342547 A1* | 12/2013 | Lum | G06T 15/005 345/505 |

OTHER PUBLICATIONS

Search Report for GB1319834.6, dated Apr. 29, 2014 (3 pgs.).
[Online], M. Abrash, "Rasterization on Larrabee", https://software.intel.com/en-us/articles/rasterization-on-larabee, printed Jun. 6, 2014, 30 pgs, 2011.

* cited by examiner

*Primary Examiner* — Kee M Tung
*Assistant Examiner* — Nicholas R Wilson
(74) *Attorney, Agent, or Firm* — Nixon & Vanderhye P.C.

(57) ABSTRACT

A technique is provided for performing rasterisation of input primitives to generate graphics fragments to be processed to generate output data. The technique comprises determining a bounding box for an input primitive, and performing a multi-level patch analysis, each patch having an array of grid points defining boundaries of a set of sub-patches within that patch. The technique further comprises, when performing patch analysis of a selected patch, performing a bounding box evaluation step to determine if a condition exists where the bounding box does not cover any of the grid points, or if a special grid point coverage condition exists, and in the presence of the condition, adopting an alternative operation for that selected patch instead of a default operation. The alternative operation is configured to determine whether the primitive at least partially covers any of the sub-patches of the selected patch.

19 Claims, 19 Drawing Sheets

TRIANGLES GIVING RISE TO
OPTIMISED PROCESSING A

IDENTIFYING NEXT PATCH

| 4 x 4 | | | |
|---|---|---|---|
| 3 | 4 | 8 | 9 |
| 6 | 5 | 11 | 10 |
| 18 | 19 | 13 | 14 |
| 21 | 20 | 16 | 15 |

| 8 x 8 | |
|---|---|
| 2 | 7 |
| 17 | 12 |

| 16 x 16 |
|---|
| 1 |

FIG. 8

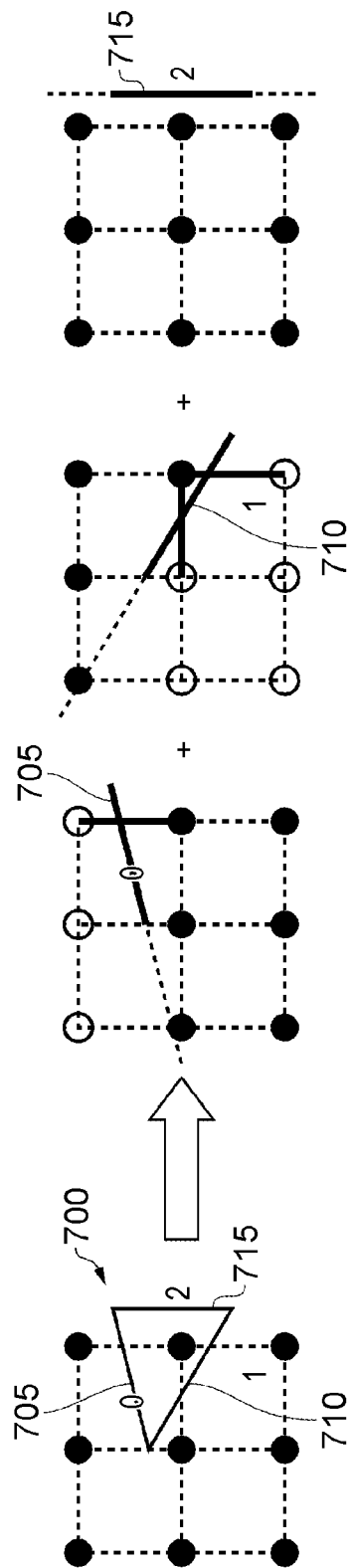
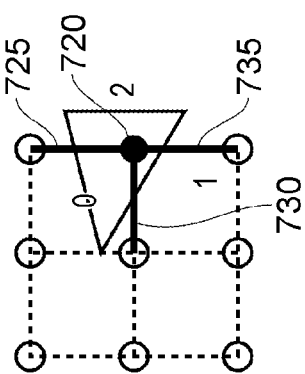
FIG. 9A
FIG. 9B

ABSTRACT
RASTERIZATION IN GRAPHICS PROCESSING SYSTEM

This application claims priority to GB Patent Application No. 1319834.6 filed 11 Nov. 2013, the entire contents of which is hereby incorporated by reference.

FIELD

The present technique relates to a system and method for performing rasterisation within a graphics processing system.

BACKGROUND

When processing 3D graphics, a scene to be displayed is typically split into a number of basic components called "primitives" in order to allow the 3D graphics processing operations to be more readily carried out. The primitives are usually in the form of simple polygons, such as triangles.

Each primitive is typically defined by the vertices that make up the primitive, and each vertex will have associated with it particular data values representing the primitive at the vertex position, for example the X and Y position of the vertex, a depth (Z) value, colour and transparency values, etc. Within the graphics processing system, a primitive setup stage is performed that uses the data defined for each vertex of a given primitive in order to determine a plurality of functions for that primitive, such as edge functions that represent the geometric edges of the primitive, and a depth function used to determine a depth value at any particular point within the primitive (these edge and depth functions also being referred to as edge and depth equations herein). The primitive setup stage may also determine other functions such as interpolation functions that represent the way that the data values such as the colour values will vary across the primitive.

Following the primitive setup stage, a graphics primitive will be passed through a rasterization stage, where a rasterization operation is performed in order to determine a plurality of graphics fragments to be used to represent that graphics primitive, the rasterization operation determining the X and Y positions of each of those graphics fragments. Following rasterization, the graphics fragments are then passed through a rendering stage where the graphics fragments are subjected to colouring operations, shading operations, etc., in order to generate an output for display on a display screen.

Each graphics fragment (data element) may correspond to a single pixel (picture element) in the final display, or it can be the case that there is not a one-to-one correspondence between fragments and display pixels, for example where particular forms of post-processing such as down-scaling are carried out on the rendered image prior to displaying the final image.

It is known within the rasteriser to employ a multi-level patch analysis process in order to determine the graphics fragments that need to be generated for each input primitive. In accordance with such a technique, at a first level the render output area (e.g. a tile in a tile-based rendering system, or the entire frame in an immediate mode rendering system) is divided into one or more patches, and then at each subsequent level the render output area is subdivided into a plurality of patches smaller than the patches of the preceding level. Each patch has an array of grid points defining boundaries of a set of sub-patches within that patch. At each level, starting with the first level, the edges of the primitive are tested against the grid points to detect whether the grid points are inside or outside of the primitive, and hence determine which of the sub-patches are at least partially covered by the primitive (i.e. which sub-patches are entirely or partly inside the boundaries of the primitive). For any sub-patches that are at least partially covered by the primitive, the patch analysis process can then transfer to a lower level, where those sub-patches are treated as patches to be analysed at that lower level.

Such a process can in many instances provide an efficient mechanism for determining the graphics fragments that need to be generated for each input primitive. However, where an input primitive occupies a relatively small area within the render output area, such a process will become inefficient.

Accordingly, it would be desirable to provide a more efficient mechanism for performing a multi-level patch analysis in such situations.

SUMMARY

Viewed from a first aspect, there is provided a method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive: determining from the vertex data a bounding box for the input primitive; performing a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive; the method further comprising, when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

Viewed from a second aspect, there is provided a method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive: determining from the vertex data a bounding box for the input primitive; performing a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive; the method further comprising, when performing patch analysis of a selected patch, performing a bounding box evaluation step to determine if a special grid point coverage condition exists, and, in the presence of said special grid point coverage condition, adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

Viewed from a third aspect, there is provided a graphics processing system comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising: bounding box determination circuitry configured to determine, from the vertex data of each input primitive, a bounding box for that input primitive; patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive; the patch analysis circuitry being further configured, when performing patch analysis of a selected patch, to perform a bounding box evaluation step to determine if a special condition exists where the bounding box does not cover any of the grid points in the array of grid points, and in the presence of said special condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive.

Viewed from a fourth aspect, there is provided a graphics processing system comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising: bounding box determination circuitry configured to determine, from the vertex data of each input primitive, a bounding box for that input primitive; patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive; the patch analysis circuitry being further configured, when performing patch analysis of a selected patch, to perform a bounding box evaluation step to determine if a special grid point coverage condition exists, and in the presence of said special grid point coverage condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive.

Viewed from a fifth aspect there is provided a method comprising: determining a bounding box for an input primitive; and performing a multi-level patch analysis; each patch having an array of grid points defining boundaries of a set of sub-patches within that patch; the method further comprising, when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of a default operation, said alternative operation being configured to determine whether the primitive at least partially covers any of the sub-patches of the selected patch.

Viewed from a sixth aspect there is provided a method comprising: determining a bounding box for an input primitive; and performing a multi-level patch analysis; each patch having an array of grid points defining boundaries of a set of sub-patches within that patch; the method further comprising, when performing patch analysis of a selected patch, performing a bounding box evaluation step to determine if a special grid point coverage condition exists, and, in the presence of said special grid point coverage condition, adopting an alternative operation for that selected patch instead of a default operation, said alternative operation being configured to determine whether the primitive at least partially covers any of the sub-patches of the selected patch.

BRIEF DESCRIPTION OF THE DRAWINGS

The present technique will be described further, by way of example only, with reference to embodiments thereof as illustrated in the accompanying drawings, in which:

FIG. 8 is a diagram schematically illustrating how a next patch to be processed may be identified at step 465 of FIG. 5B in accordance with one embodiment, the numbering scheme adopted assuming that all sub-patches are determined to require processing during patch analysis at a higher patch level; and FIGS. 9A and 9B are diagrams illustrating how the process of steps 600 and 605 of FIG. 7A may be performed in accordance with one embodiment.

DESCRIPTION OF EMBODIMENTS

Figure 1A:
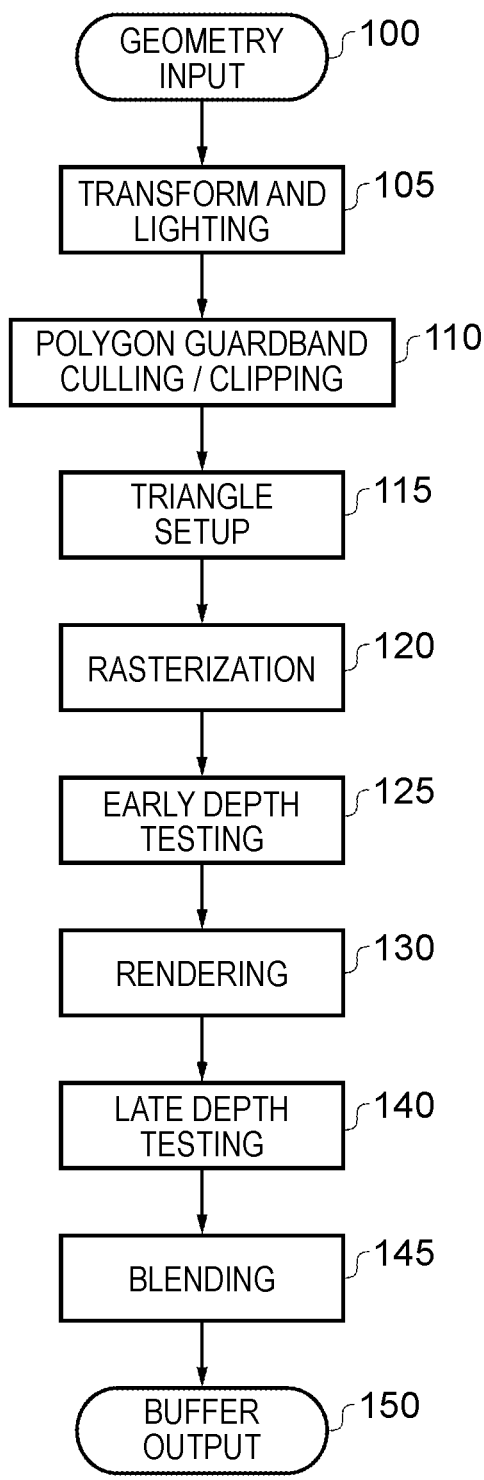
FIG. 1A schematically illustrates a sequence of steps performed in accordance with one embodiment when processing geometry input in order to generate an output for display.

Before discussing the embodiments with reference to the accompanying figures, the following description of embodiments and associated advantages is provided.

Viewed from a first aspect, an embodiment provides a method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive: determining from the vertex data a bounding box for the input primitive; performing a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive; the method further comprising, when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

In accordance with the above-described technique, the default operation performed in respect of a selected patch during patch analysis is replaced by an alternative operation in the presence of a special condition, a bounding box evaluation step being performed in order to detect, as the special condition, a condition where the bounding box does not cover any of the grid points in the array of grid points provided by the patch currently being analysed. In the presence of the special condition, the alternative operation is able to determine whether the input primitive at least partially covers any of the sub-patches of the selected patch without testing the grid points of the selected patch against each edge equation of the input primitive, thereby providing a significant increase in performance.

In one embodiment, the bounding box evaluation step determines existence of the special condition if the bounding box does not cover any of the grid points in the array of grid points, and the bounding box is contained entirely within a single sub-patch. In such a situation, it is known that none of the grid points are covered by the primitive, and further that the primitive does not cross any of the grid edges (i.e. the lines extending between adjacent grid points within the patch). Hence, without testing the grid points against each of the edge equations, it is already known that one single sub-patch is at least partially covered by the primitive, and that all of the other sub-patches are not covered. Further, the one sub-patch that is at least partially covered is known by virtue of the location of the bounding box.

In one embodiment, on detection of the special condition, the alternative operation marks the single sub-patch containing the bounding box as partially covered and marks all other sub-patches of the selected patch as not covered.

In one embodiment, the default operation uses data generated by the testing of the grid points of the selected patch against each edge equation of the primitive in order to determine grid point coverage information for each grid point in the array and grid edge coverage information for each grid edge between adjacent grid points in the array in order to identify grid points and grid edges covered by the input primitive. However, on detection of the special condition, the alternative operation can instead directly populate the grid point coverage information and grid edge coverage information to identify that no grid points and no grid edges are covered by the input primitive.

In one embodiment, each input primitive has a depth equation associated therewith, and the default operation further comprises performing a depth calculation operation using the depth equation of the primitive in order to determine a depth range for each sub-patch. However, in the event of the special condition being detected, the alternative operation instead determines the depth range without performing the depth calculation operation. The depth calculation operation performed as part of the default operation can take a variety of forms, but in one embodiment comprises testing of the grid points of the selected patch against the depth equation of the primitive to determine depth values for the grid points in order to determine the depth range for each sub-patch. However, in the event of the special condition being detected, the alternative operation instead determines the depth range without testing the grid points of the selected patch against the depth equation.

In one particular embodiment, the alternative operation determines the depth range from the depth values associated with each vertex of the input primitive. In particular, a minimum and maximum depth value can be determined from the depth value associated with each vertex of the input primitive, with the depth range extending between those determined minimum and maximum depth values.

Alternatively, or in addition as another variant of the special condition, the bounding box evaluation step can be configured to determine existence of the special condition if the bounding box does not cover any of the grid points in the array of grid points, and the bounding box crosses only one of grid edges extending in a first direction between the grid points and grid edges extending in a second direction between the grid points, the second direction being orthogonal to the first direction. Assuming the grid points form an array of grid points extending in the X (horizontal) direction and the Y (vertical) direction, then the first direction will either be the X direction or the Y direction, and the second direction will be the other of those two directions. Hence, if the bounding box does not cover any of the grid points and the only grid edges crossed are grid edges extending in the same direction, either horizontally or vertically (but not both), then again a special condition is detected.

In one embodiment, on detection of this variant of the special condition, the alternative operation marks each sub-patch of the selected patch that is touched by the bounding box as partially covered, and marks all other sub-patches of the selected patch as not covered.

In one embodiment, on detection of this variant of the special condition the alternative operation determines the grid point coverage information and grid edge coverage information to identify that no grid points are covered by the input primitive and to use the bounding box to determine which grid edges are covered by the input primitive.

Whilst for the earlier described special condition, testing of the grid points against the depth equation can also be omitted in addition to omitting testing of the grid points against each edge equation, with the above variant of the special condition it will typically be appropriate to still test the grid points against the depth equation, since the bounding box identifies that the primitive crosses at least one grid edge between adjacent sub-patches, and accordingly it is appropriate to determine depth values for at least the grid points connected to each crossed grid edge. Nevertheless, significant performance benefits can still be realised by avoiding the need to test the grid points against each edge equation of the input primitive.

Viewed from a second aspect, an embodiment provides a method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive: determining from the vertex data a bounding box for the input primitive; performing a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive; the method further comprising, when performing patch analysis of a selected patch, performing a bounding box evaluation step to determine if a special grid point coverage condition exists, and, in the presence of said special grid point coverage condition, adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

In accordance with the above-described technique, the default operation performed in respect of a selected patch during patch analysis is replaced by an alternative operation in the presence of a special grid point coverage condition, a bounding box evaluation step being performed in order to detect the special grid point coverage condition. In the presence of the special grid point coverage condition, the alternative operation is able to determine whether the input primitive at least partially covers any of the sub-patches of the selected patch without testing the grid points of the selected patch against each edge equation of the input primitive, thereby providing a significant increase in performance.

In one embodiment, the bounding box evaluation step determines existence of the special grid point coverage condition if only a single grid point is covered by the bounding box, and that single grid point matches a grid point of a patch at a previous level of the patch analysis. In that instance, the grid point coverage information for every grid point of the selected patch currently under consideration can either be inherited from the grid point coverage information of the corresponding grid point of the patch at a previous level of the patch analysis, or can be inferred from that inherited grid point coverage information. In one particular embodiment where a regular array of 3×3 grid points is provided for each patch, the grid point coverage information for the four corner grid points of a selected patch currently being considered can be inherited in such a situation from the matching grid points of the patch at the previous level of the patch analysis (i.e. those four grid points defining the corners of the relevant sub-patch at that previous level). The grid point coverage information for the remaining five grid points can then be inferred.

In one embodiment, the alternative operation is hence configured to inherit grid point coverage information from the patch at the previous level for grid points matching grid points of the patch at the previous level of the patch analysis, and to mark as partially covered the sub-patch that includes both a grid point that has inherited grid point coverage information from the patch at the previous level and which is touched by the bounding box. In the above particular example of only a single grid point being covered by the bounding box, it will accordingly be understood that only one sub-patch will include a grid point that has both inherited grid point coverage information from the patch at the previous level, and will be a sub-patch that is touched by the bounding box.

Alternatively, or in addition as another variant of the special grid point coverage condition, the bounding box evaluation step is configured in one embodiment to determine existence of the special grid point coverage condition if multiple grid points are covered by the bounding box, those multiple grid points are extending in one of an X direction and a Y direction through the grid array, and a first and a last of the covered multiple grid points match a grid point of a patch at a previous level of the patch analysis.

In one such embodiment, the alternative operation is configured to inherit grid point coverage information from the patch at the previous level for grid points matching grid points of the patch at the previous level of the patch analysis, and to mark as a partially covered those sub-patches that includes both a grid point that has inherited grid point coverage information from the patch at the previous level and which is touched by the bounding box.

As mentioned previously, the default operation uses data generated by the testing of the grid points of the selected patch against each edge equation in order to determine grid point coverage information and grid edge coverage information for the grid points of the current patch under consideration. In contrast, on detection of the special grid point coverage condition, the alternative operation determines the grid point coverage information and grid edge coverage information by inheriting grid point and grid edge coverage information for grid points and grid edges matching grid points and grid edges of the patch at the previous level of the patch analysis, and by inferring the grid point and grid edge coverage values for the remaining grid points and grid edges. Since there is no need to test the grid points against the edge equations when using the alternative operation, a significant performance benefit can be realised.

As also mentioned earlier, the default operation may further comprise performing a depth calculation operation using the depth equation of the primitive in order to determine a depth range for each sub-patch, for example by evaluation of the grid points of the selected patch against the depth equation of the primitive to determine depth values for the grid points in order to determine the depth range for each sub-patch. However, in contrast, in the event of the special grid point coverage condition being detected, the alternative operation may optionally be arranged to determine the depth range without performing the depth calculation operation, and hence in the above example without testing the grid points of the selected patch against the depth equation, thereby giving rise to further performance improvements. In one particular embodiment, the alternative operation determines the depth range by inheriting depth range information for grid points matching grid points of the patch at the previous level of the patch analysis.

In one embodiment, at each level the patch analysis may further comprise performing a depth testing and update operation, and if for a current selected patch the equivalent sub-patch at the preceding level of the patch analysis passed the depth testing and update operation, the patch analysis skips the depth testing part of the depth testing and update operation.

There are a number of ways in which the bounding box for the input primitive may be determined from the vertex data. In one embodiment, the process of determining the bounding box comprises determining minimum and maximum X and Y values from the vertex data, and snapping said minimum and maximum X and Y values out to the boundaries of the nearest sub-patch associated with the final level of the patch analysis in order to determine the boundaries of the bounding box so as to ensure that all pixel sampling points for pixels within the primitive are covered by the bounding box. Hence, considering the particular example where the sub-patch associated with the final level of the patch analysis is a 2×2 pixel quad, the step of snapping the minimum and maximum X and Y values out the boundaries of the nearest sub-patch will involve snapping those values to the nearest pixel quad boundary, in a way that ensures that the sampling points for individual pixels that are within the primitive are covered by the bounding box.

As discussed earlier, for each of the above described aspects, at each level the patch analysis comprises, for each of one or more selected patches at that level, performing a default operation where the grid points of the selected patch are tested against the edge equations of the primitive. However, in one embodiment this need not be performed for every selected patch. For example if a selected patch has been determined to be fully covered by the primitive (during the previous level of the patch analysis), then in one embodiment the fully covered patch will not be further subdivided and hence the sub-patches of that selected patch will not be further analysed. Such an approach is described in commonly owned co-pending U.S. patent application Ser. No. 13/907,559, the entire contents of which are hereby incorporated by reference. This saves storage space. For example, if a fully covered 16×16 patch reaches the 8×8 level of the patch analysis, it will only take up 1 slot in the storage buffer (e.g. a fifo) instead of 4 slots as it would if it had been subdivided (and subsequently 1 slot instead of 16 slots when it reaches the 4×4 level of the patch analysis). Instead the patch can be divided into fragments by some later, cheaper mechanism after the patch has been sent as an output from the subdivision process.

In one embodiment a graphics processing system is provided comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising: bounding box determination circuitry configured to determine, from the vertex data of each input primitive, a bounding box for that input primitive; patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive; the patch analysis circuitry being further configured, when performing patch analysis of a selected patch, to perform a bounding box evaluation step to determine if a special condition exists where the bounding box does not cover any of the grid points in the array of grid points, and in the presence of said special condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive.

In one embodiment a graphics processing system is provided comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising: bounding box determination circuitry configured to determine, from the vertex data of each input primitive, a bounding box for that input primitive; patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive; the patch analysis circuitry being further configured, when performing patch analysis of a selected patch, to perform a bounding box evaluation step to determine if a special grid point coverage condition exists, and in the presence of said special grid point coverage condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive.

In accordance with a further embodiment, a graphics processing system is provided comprising rasterising means for performing rasterisation of input primitives in order to generate graphics fragments to be processed by rendering means in order to generate output data for display in a render output area, each input primitive specifying vertex data, and having at least one edge equation associated therewith, the system comprising: bounding box determination means for determining, from the vertex data of each input primitive, a bounding box for that input primitive; patch analysis means for performing, for each input primitive, a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis means further for sub-dividing that selected patch into the set of sub-patches, and for each sub-patch that the primitive at least partially covers, for treating that sub-patch as a selected patch to be analysed at the next level of the patch analysis; and graphics fragment generating means for generating one or more graphics fragments for at least each sub-patch of the final level of the patch analysis determined to be covered at least partially by the primitive; the patch analysis means further for performing, when performing patch analysis of a selected patch, a bounding box evaluation step to determine if a special condition exists where the bounding box does not cover any of the grid points in the array of grid points, and in the presence of said special condition the patch analysis means for adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

In accordance with a further embodiment, a graphics processing system is provided comprising rasterising means for performing rasterisation of input primitives in order to generate graphics fragments to be processed by rendering means in order to generate output data for display in a render output area, each input primitive specifying vertex data, and having at least one edge equation associated therewith, the system comprising: bounding box determination means for determining, from the vertex data of each input primitive, a bounding box for that input primitive; patch analysis means for performing, for each input primitive, a multi-level patch analysis in order to determine patches covered at least partially by the input primitive, at a first level the render output area being divided into one or more patches, and at each subsequent level the render output area being divided into a plurality of patches smaller than the patches of the preceding level; each patch having an array of grid points defining boundaries of a set of sub-patches within that patch; at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch; for any selected patch for which it is determined that the primitive at least partially covers any of the sub-patches of that patch, and assuming the final level of the patch analysis has not been reached, the patch analysis means further for sub-dividing that selected patch into the set of sub-patches, and for each sub-patch that the primitive at least partially covers, for treating that sub-patch as a selected patch to be analysed at the next level of the patch analysis; and graphics fragment generating means for generating one or more graphics fragments for at least each sub-patch of the final level of the patch analysis determined to be covered at least partially by the primitive; the patch analysis means further for performing, when performing patch analysis of a selected patch, a bounding box evaluation step to determine if a special grid point coverage condition exists, and in the presence of said special grid point coverage condition the patch analysis means for adopting an alternative operation for that selected patch instead of said default operation, said alternative operation being configured to determine whether the primitive at least partially covers any of the sub-patches of the selected patch without testing the grid points of the selected patch against the at least one edge equation of the primitive.

In accordance with a yet further embodiment, a method is provided comprising: determining a bounding box for an input primitive; and performing a multi-level patch analysis; each patch having an array of grid points defining boundaries of a set of sub-patches within that patch; the method further comprising, when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of a default operation, said alternative operation being configured to determine whether the primitive at least partially covers any of the sub-patches of the selected patch. In one embodiment the alternative operation is able to determine whether the input primitive at least partially covers any of the sub-patches of the selected patch without testing the grid points of the selected patch against each edge equation of the input primitive, thereby providing a significant increase in performance.

In accordance with a yet further embodiment a method is provided comprising: determining a bounding box for an input primitive; and performing a multi-level patch analysis; each patch having an array of grid points defining boundaries of a set of sub-patches within that patch; the method further comprising, when performing patch analysis of a selected patch, performing a bounding box evaluation step to determine if a special grid point coverage condition exists, and, in the presence of said special grid point coverage condition, adopting an alternative operation for that selected patch instead of a default operation, said alternative operation being configured to determine whether the primitive at least partially covers any of the sub-patches of the selected patch. In one embodiment the alternative operation is able to determine whether the input primitive at least partially covers any of the sub-patches of the selected patch without testing the grid points of the selected patch against each edge equation of the input primitive, thereby providing a significant increase in performance.

Particular embodiments will now be described with reference to the figures.

FIG. 1A is a flow diagram illustrating steps performed within a graphics processing pipeline of a graphics processing unit in accordance with one embodiment. At step 100, geometry input is received, for each primitive this including an indication of the vertices that make up that primitive, and a number of data values representing the primitive at each vertex position, for example the X and Y position of the vertex, a depth (Z) value, colour and transparency values, etc.

At step 105, the geometry input is passed through a transform and lighting stage that receives the primitives and applies transformations and lighting effects to the primitives (or more particularly to the vertices that define the primitives), as is known in the art.

Following step 105, a polygon guard band culling stage 110 is performed where any primitives (also referred to herein as polygons) falling entirely within a guard band may be culled, and any primitives extending into the guard band may be clipped. Hence, at this stage any primitive outside of the view frustum may be culled or any portion of a primitive extending outside of the view frustum may be clipped. As will be understood by those skilled in the art, in 3D graphics processing, rendering conceptually takes place within the so-called "view frustum", which is, in effect, a box in front of the viewer's position which represents the three-dimensional volume within which primitives may need to be rendered for display. The guard band is outside the view frustum, and hence primitives (or portions of primitives) falling within the guard band will not need to be rendered.

Following steps 110, if a primitive has not been culled at step 110 it will then be passed (in clipped form if clipping has been applied) to the primitive setup stage 115 (referred to in FIG. 1A as the triangle setup stage since typically the triangle is the most common form of primitive). During the primitive setup stage the data defined for each vertex of the given primitive is used in order to determine a plurality of functions for that primitive, such as edge functions that represent the geometric edges of the primitive, and a depth function used to determine a depth value at any particular point within the primitive. Other functions may also be computed at this stage, such as interpolation functions that represent the way that the data values such as the colour values will vary across the primitive.

Following step 115, the primitive data, including the various functions computed by the triangle setup stage, are passed through the rasterization stage 120, where a rasterization operation is performed in order to determine a plurality of graphics fragments to be used to represent each graphics primitive. Each of the graphics fragments used to represent the graphics primitive will have associated X and Y positions. Following rasterization, the graphics fragments are then passed through the rendering stage 130, but optionally they may first be subjected to some early depth testing within the early depth testing stage 125. Depth testing is an operation used to determine, for each graphics fragment output by the rasterizing stage, a depth value for that graphics fragment using the depth function calculated during the triangle setup stage, and then to determine with reference to a Z-buffer value maintained for the position data associated with that graphics fragment whether that graphics fragment is to be displayed. In particular, for each X, Y position, the Z-buffer aims to keep track of the fragment that is closest to the viewer, and hence is the fragment that will need to be displayed.

During the rendering stage 130, the fragments from the rasterizer (as subjected to any early depth testing) are received, and various rendering operations are applied such as colouring operations, shading operations, etc. These processes will be applied by invoking one or more shader programs to perform the required operations on the graphic fragments.

The outputs from the rendering stage 130 are then passed through the late depth testing stage 140 where any late depth testing is performed (late depth testing may not be required if early depth testing has been performed). The output is then passed through the blending circuitry 145, where any required blending operations are performed. In particular, if at a current X, Y position the graphics fragment that is identified in the Z-buffer as being closest to the viewer is not entirely opaque, then it will be necessary to blend properties such as the colour of that closest graphics fragment with the properties of one or more graphics fragments behind that closest graphics fragment. Following any blending operations required at stage 145, the resultant graphics fragment data representing the final form of the corresponding pixel to be displayed is stored in the output buffer at the buffer output stage 150.

Figure 1B:
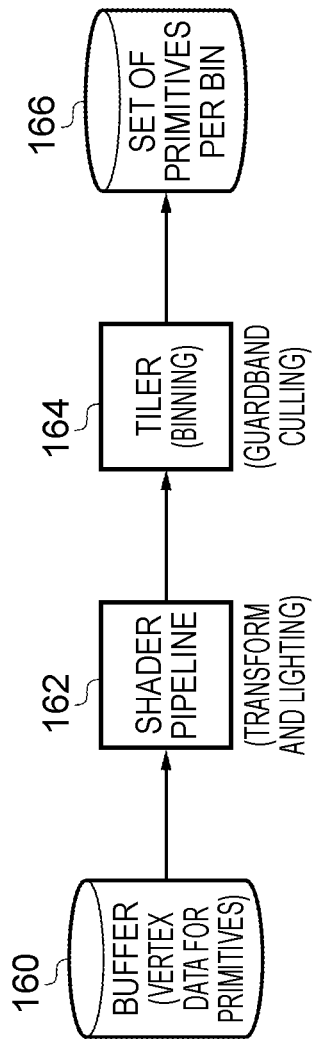
FIGS. 1B and 1C are block diagrams illustrating components that may be provided within a graphics processing system to implement the process of FIG. 1A in accordance with one embodiment.
Figure 1C:
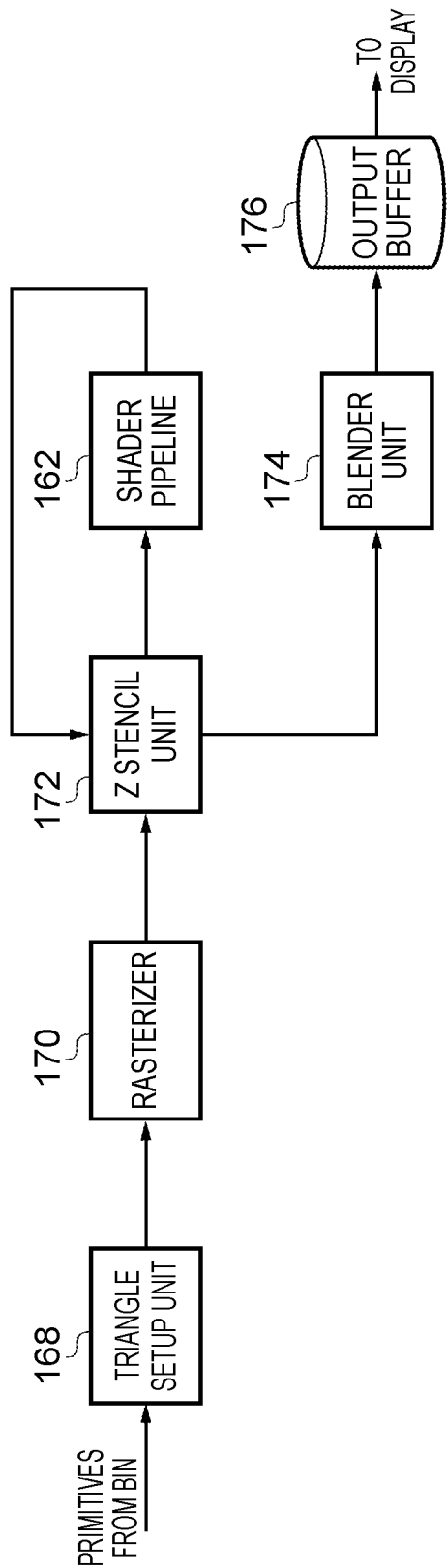

FIGS. 1B and 1C are block diagrams illustrating components provided within a graphics processing unit in accordance with one embodiment in order to implement the process of FIG. 1A. A buffer 160 containing the original vertex data for the primitives to be displayed is accessed by a shader pipeline 162 in order to perform the transform and lighting operations described earlier with reference to step 105 of FIG. 1A. Thereafter, the output from the shader pipeline is passed to a tiler unit 164 used to implement a binning operation. In accordance with tile-based rendering, rather than the entire scene effectively being processed in one go (as would be the case in so-called "immediate mode" graphics processing or rendering), the scene to be displayed is divided into a plurality of smaller sub-regions usually referred to as tiles. Each tile is rendered separately (typically one after another), and the rendered tiles are then recombined to provide the complete scene for display. In such arrangements, the scene is typically divided into regularly-sized and shaped sub-regions (tiles), for example squares or rectangles, but this is not essential. For a particular tile under consideration, the tiler unit 164 performs a binning operation in order to decide which primitives intersect the tile, and any primitive that intersects the tile is then placed in a "bin" for that tile. Accordingly, the output from the tiler 164 is a set of primitives per bin, which is stored within the buffer 166. The graphics processing unit is then arranged to process one tile at a time.

In particular, as shown in FIG. 1C, for a particular tile under consideration, the primitives from the associated bin will be forwarded to the triangle setup unit 168, which will perform the triangle setup operation described earlier with reference to step 115 of FIG. 1A, prior to outputting the resultant data to the rasterizer 170 where the rasterization operation described with reference to step 120 of FIG. 1A will be performed. The Z stencil unit 172 is then used to perform any early depth testing required by step 125 of FIG. 1A, before outputting the data to the shader pipeline 162 which is arranged to perform the rendering operations described with reference to step 130 of FIG. 1A. The output from the shader pipeline is then routed back through the Z stencil unit 172, where any late depth testing required by step 140 is performed, prior to the output then being routed to the blender unit 174 for any required blending operations. The output from the blender unit is then stored within the output buffer 176, prior to being combined with the output for other tiles in order to generate the scene for display.

Whilst a tile-based approach is described above, it will be appreciated that the techniques discussed herein could equally be applied to other rendering techniques, for example the earlier-mentioned immediate mode rendering, where the entire scene is effectively processed in one go.

Figure 2A:
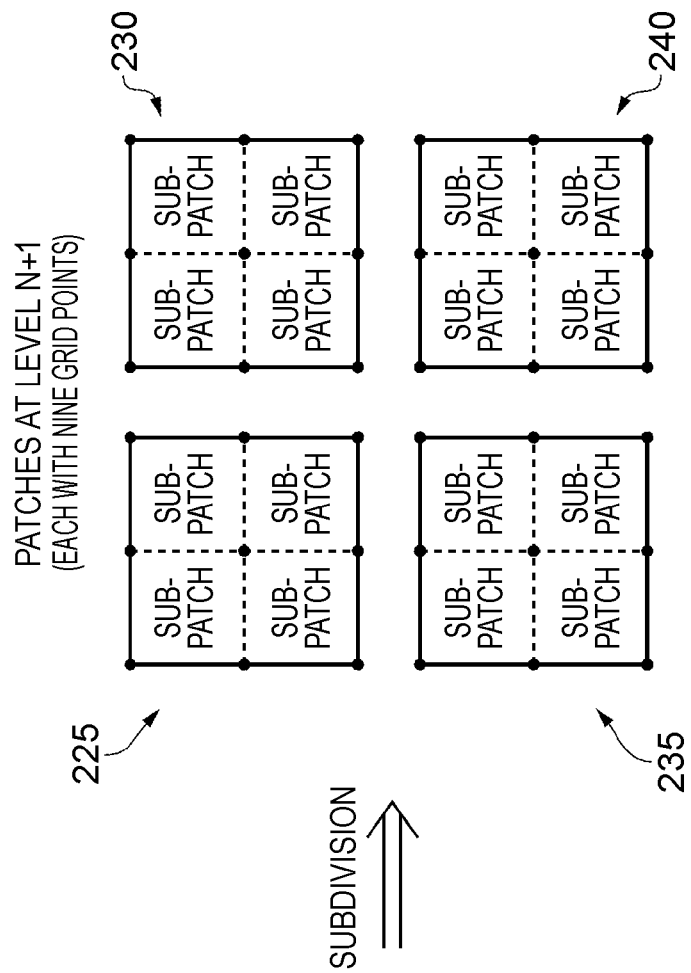
FIGS. 2A and 2B schematically illustrate a multi-level patch analysis process performed by a rasterizer in accordance with one embodiment.
Figure 2A:
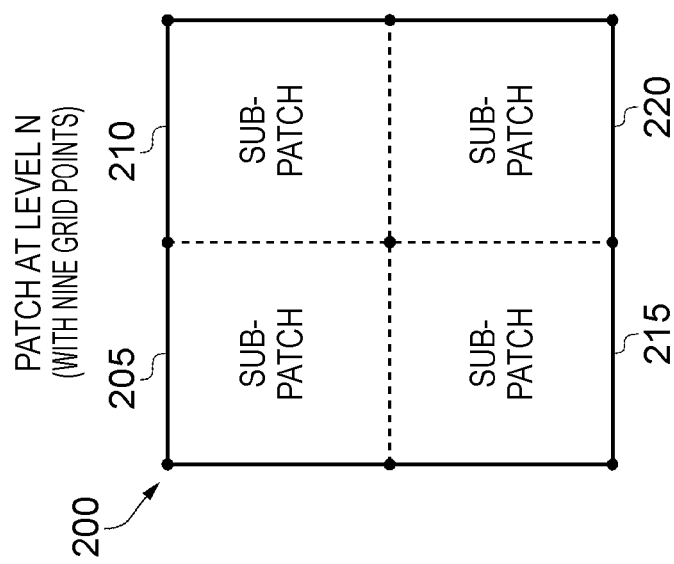

As discussed earlier, the rasterizer in one embodiment is arranged to perform a multi-level patch analysis in order to determine the graphics fragments that need to be generated for each input primitive. In particular, at a first level the render output area (which in one embodiment corresponds with a tile consisting of an array of 16×16 pixels) is divided into one or more patches, and at each subsequent level the render output area is divided into a plurality of patches smaller than the patches of the preceding level. In one particular embodiment, at the first level a single patch is defined corresponding to the tile area. As shown in FIG. 2A, a patch 200 at any particular level N will have an array of grid points defining boundaries of a set of sub-patches within that patch. Hence, in the example of FIG. 2A, the array of grid points comprises a 3×3 array of grid points, defining the four sub-patches 205, 210, 215, 220.

As a default operation performed for each selected patch at a particular patch level, the grid points of the selected patch are tested against each edge equation of the input primitive in order to determine whether the primitive at least partially covers any of the sub-patches of that selected patch.

For any selected patch for which it is determined that the primitive at least partially covers any of the sub-patches of that patch, and assuming the final level of the patch analysis has not been reached, then the patch analysis further comprises sub-dividing the selected patch into the set of sub-patches, and for each sub-patch that the primitive at least partially covers, that sub-patch is then treated as a selected patch to be analysed at the next level of the patch analysis.

This sub-division process is illustrated schematically in FIG. 2A, and assumes that all four of the sub-patches 205, 210, 215, 220 require processing as patches at the next level. Accordingly, for the sub-patch 205 at level N, a corresponding patch 225 at level N+1 is produced, and similarly sub-patch 210 at level N results in a corresponding patch 230 at level N+1, sub-patch 215 at level N results in a corresponding patch 235 at level N+1 and sub-patch 220 results in a corresponding patch 240 at level N+1. Each of the patches at level N+1 again has an array of nine grid points defining four sub-patches. It will be apparent that the four corner patches of each patch 225, 230, 235, 240 correspond directly with grid points in the patch 200 at the higher level, but the other remaining grid points are new grid points which have no equivalent grid point in the patch at the higher level N.

If when performing the patch analysis at level N, it was determined that any of the sub-patches 205, 210, 215, 220 were not at least partially covered by the primitive, then during the sub-division process a corresponding patch at level N+1 will not be generated, since there is no need to perform any further analysis of that patch at the lower level of the patch analysis process.

Figure 2B:
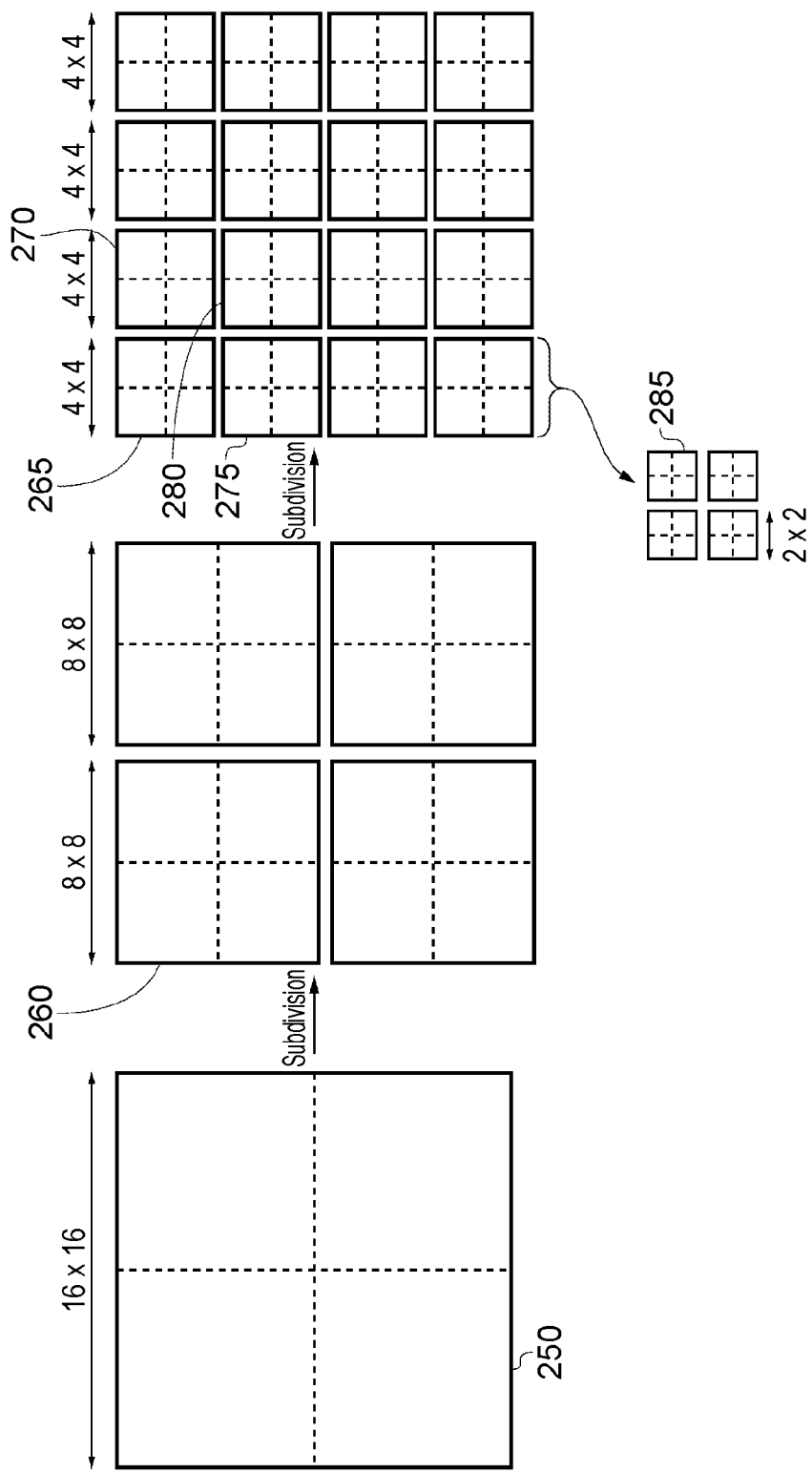

FIG. 2B schematically illustrates the sub-division process performed in one embodiment, where the first patch 250 corresponds directly to an input tile of 16×16 pixels. The first sub-division results in a maximum of four patches being generated, each corresponding to an area of 8×8 pixels. During the next sub-division process, then up to four patches will be generated for each of the 8×8 patches, these patches being 4×4 patches. Accordingly, from the patch 260, the corresponding four patches 265, 270, 275, 280 may be generated. In one embodiment, no further sub-division is performed, but when analysing any 4×4 patch, a corresponding four sub-patches, each relating to a 2×2 pixel quad 285, will be reviewed. For any pixel quad that is then considered to be at least partially covered by the input primitive, an indication of that pixel quad will be output to a later processing stage of the rasterizer, where one or more fragments will be generated for that pixel quad. In one embodiment, a separate fragment will be generated for each pixel within a pixel quad so identified, and in an alternative embodiment more than one fragment may be generated for each pixel, as will be understood by those skilled in the art.

In accordance with the described embodiments, prior to the multi-level patch analysis being performed, a bounding box is calculated for an input primitive to be subjected to rasterization. In one embodiment, the bounding box calculation can be performed by the rasterizer prior to performing the multi-level patch analysis, but it will be appreciated that in an alternative embodiment another component within the graphics processing system may perform the bounding box calculation.

Figure 3:
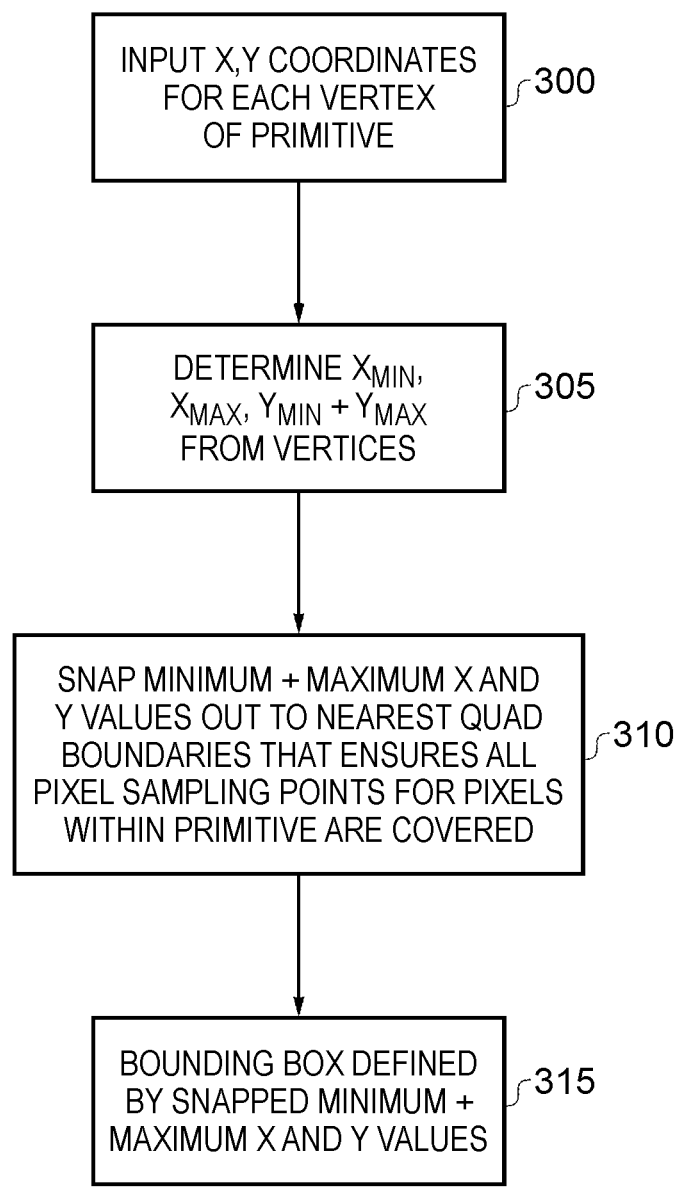
FIG. 3 is a flow diagram illustrating how a bounding box may be determined for an input primitive to be evaluated by the rasterizer.

FIG. 3 is a flow diagram illustrating the steps performed in one embodiment in order to calculate the bounding box. Firstly, at step 300, the X and Y co-ordinates for each vertex of the input primitive are retrieved, as discussed earlier the X and Y co-ordinates of each vertex being part of the original input data defining the primitive. For the example where the primitive is a triangle, it will hence be appreciated that the X and Y co-ordinates for three vertex positions will be obtained at step 300. At step 305, the minimum and maximum X and Y co-ordinates are then determined from the vertices. Hence, considering the example of a triangle, the minimum X co-ordinate value amongst the X co-ordinate values of the three vertices will be chosen as $X_{min}$, the maximum X co-ordinate value from the three vertices will be determined to be $X_{max}$, and similarly the minimum Y co-ordinate value from the three vertices will be determined to be $Y_{min}$ and the maximum Y co-ordinate value from the three vertices will be determined to be $Y_{max}$.

At step 310, the determined minimum and maximum X and Y co-ordinates are then snapped out to the nearest quad boundaries in a manner that ensures that all of the pixel sampling points for the pixels within the primitive are covered by the bounding area then enclosed within those snapped minimum and maximum X and Y values. This process will be discussed in more detail below with reference to FIGS. 4A to 4C. Following step 310, the bounding box is then defined by the snapped minimum and maximum X and Y values at step 315.

Figure 4A:
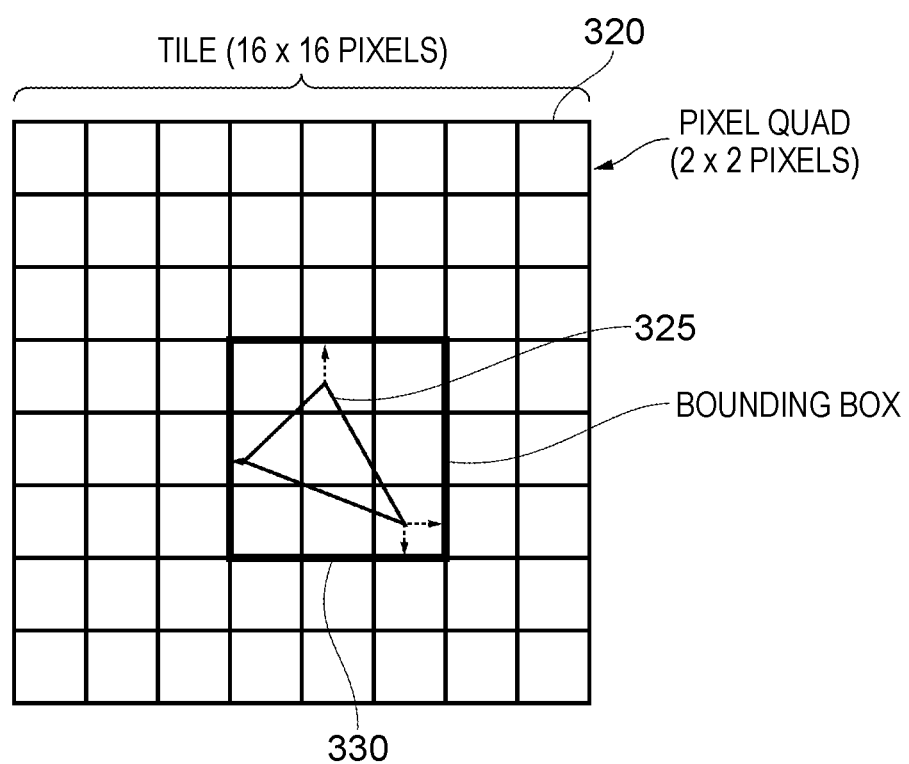
FIGS. 4A to 4C schematically illustrate the determined bounding box for some example primitives.

FIG. 4A schematically illustrates a tile consisting of an array of 16×16 pixels. Accordingly, as shown, the tile consists of 8×8 pixel quads 320, as discussed each pixel quad consisting of a 2×2 array of pixels. In this example, the triangle 325 forms an input primitive, and as shown by the dotted arrows its minimum and maximum X and Y co-ordinate values as identified by the vertices are snapped outwards to the nearest pixel quad boundary in order to form the bounding box 330.

Figure 4B:
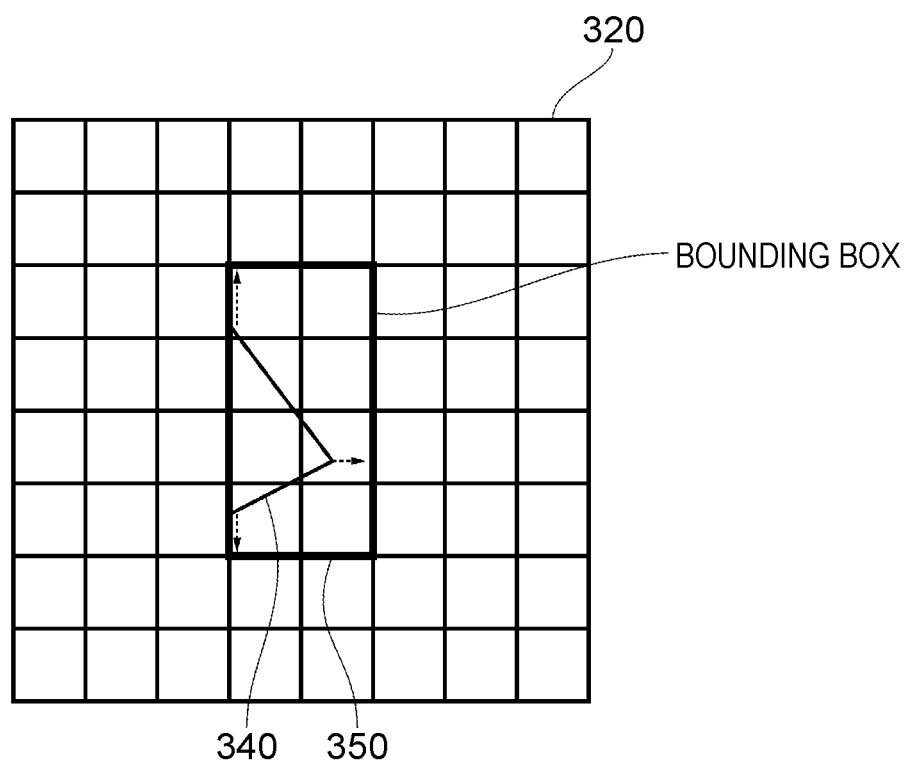

FIG. 4B shows a similar example where the triangle 340 has one side which is already aligned along a boundary between adjacent pixel quads. In this example, the resultant bounding box 350 is formed by snapping the maximum and minimum X and Y values to the nearest quad boundaries.

Figure 4C:
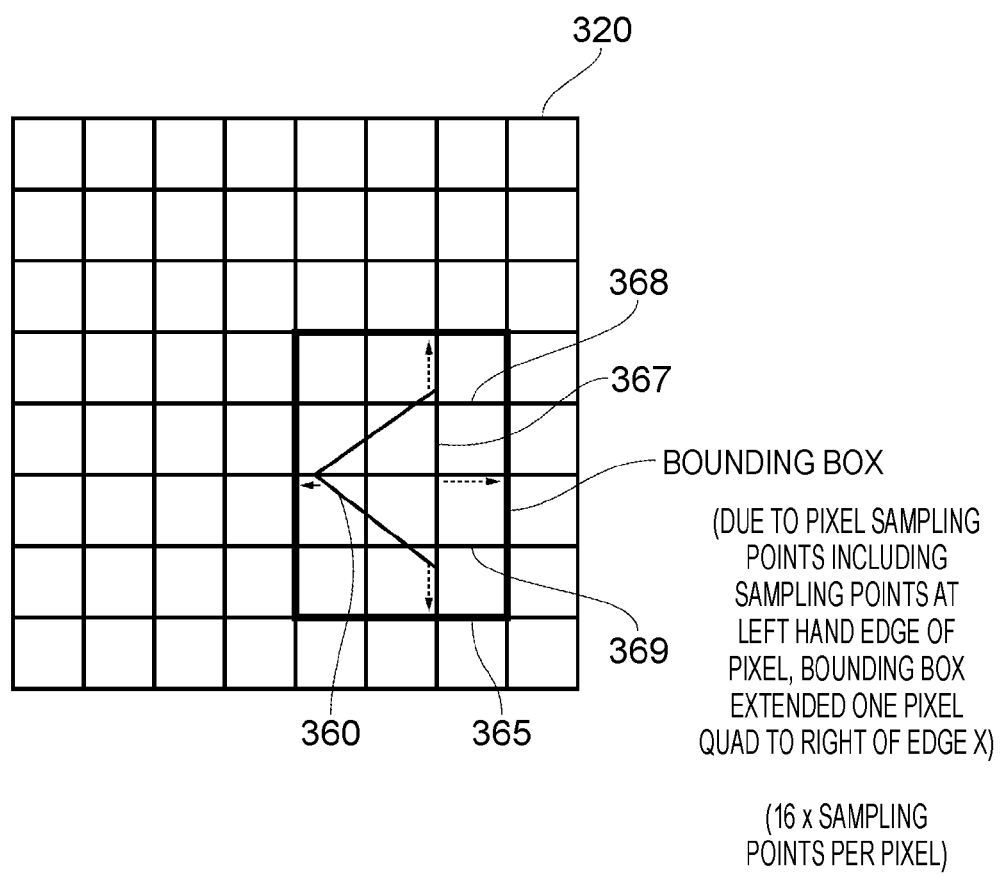

FIG. 4C shows a third example where the triangle 360 has one edge 367 which aligns against a quad boundary. However, in this example it is assumed that the sampling points used within each pixel when later performing sample testing in order to generate fragments for that pixel are distributed within the pixel so that at least one sampling point is on the left hand boundary of the pixel. Accordingly, at least the pixel quads 368 and 369 will both contain two pixels that have a sampling point touching the edge 367 of the triangle 360. Accordingly, in this instance the snapping of the minimum and maximum X and Y values to the nearest quad boundaries results in the bounding box 365 being created in order to ensure that all pixel sampling points for pixels within the primitive are covered. In particular, in accordance with the sampling point positions adopted in this embodiment, certain pixels within at least the pixel quads 368 and 369 will be considered to be within the primitive.

It should be noted that the situation discussed in FIG. 4C, where there are sample points on the border of a pixel, will only arise with certain sampling modes, for example 16× multisampling. For other modes, such as 1× and 4× multisampling, there would not be a need to extend the bounding box to the right as shown in FIG. 4C.

Once the bounding box has been created, then as will now be discussed with reference to FIGS. 5A to 5C, the multi-level patch analysis performed by the rasterizer is modified, so that in some instances the default operation requiring the grid points of a selected patch to be tested against each edge equation of the input primitive is avoided, and instead an alternative operation is performed.

As shown at step 400, the primitive data is input, this including the vertex data and the edge and depth equations for the primitive, along with the bounding box data generated by the earlier described process of FIG. 3. At step 405, the first patch to be reviewed is selected, in this instance the initial patch being a 16×16 patch corresponding to the entire tile.

Figure 6A:
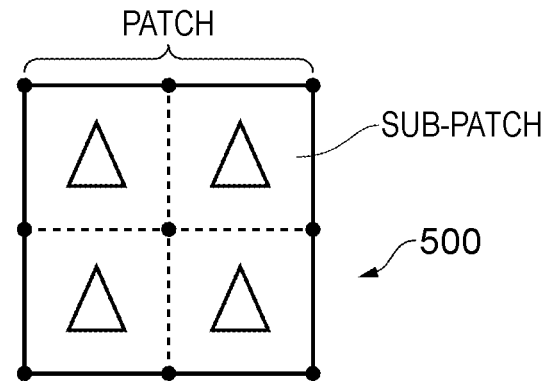
FIG. 6A illustrates an example of some primitives which will give rise to the performance of optimised processing A at step 430 of FIG. 5A in accordance with one embodiment.

At step 410, it is then determined whether the bounding box for the input primitive covers any of the grid points of the patch. For the purposes of the following discussion, it will be assumed that each patch has a 3×3 array of grid points as discussed earlier with reference 2A. If the bounding box does not cover any of the grid points of the patch, then this indicates a situation where one of two different optimised processing steps may be performed, both of which avoid testing of the grid points against the edge equations for the current patch being considered. In particular, in that instance the process proceeds to step 425, where it is determined whether the bounding box is entirely within a single sub-patch. FIG. 6A schematically illustrates four example triangles which would meet this condition, for the patch 500 illustrated in FIG. 6A. It will be appreciated that each of the triangles illustrated is an example of a triangle which has a bounding box which does not cover any grid points of the patch, and furthermore the bounding box is entirely within a sub-patch. If the bounding box is entirely within a sub-patch, then the process proceeds to step 430, where optimised processing A is performed, the steps performed at this point being discussed later with reference to FIG. 7B.

If it is determined at step 425 that the bounding box is not entirely within a single sub-patch, then the process proceeds to step 435, where optimised processing B is performed, the steps performed at this point being discussed later with reference to FIG. 7C.

Figure 6B:
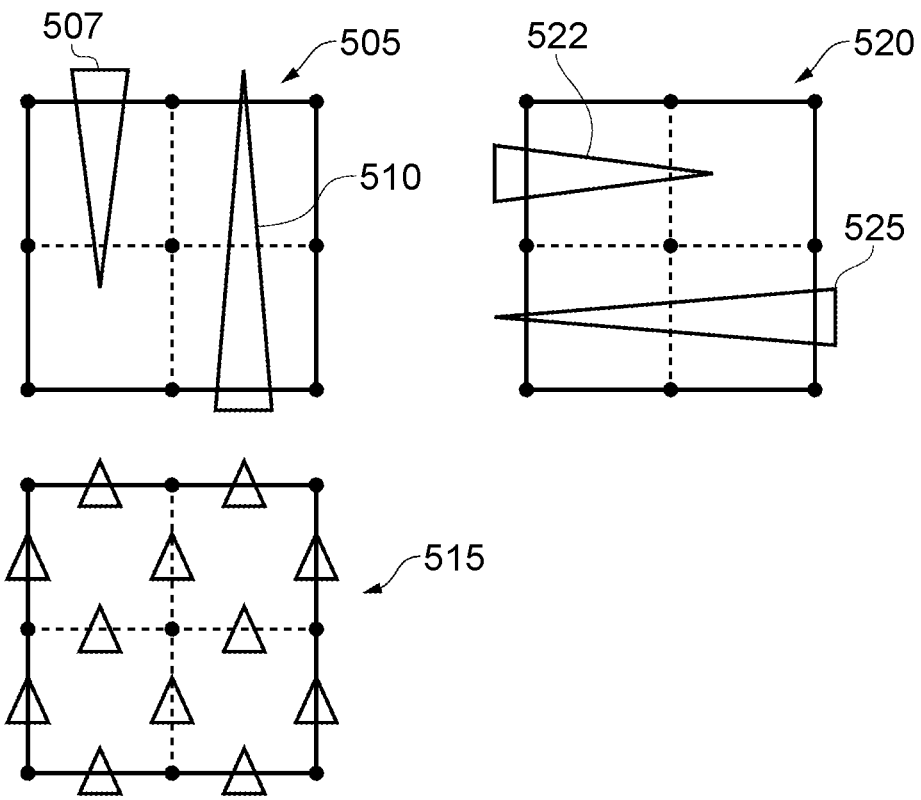
FIG. 6B illustrates some example primitives that will give rise to the performance of the optimised processing B at step 435 of FIG. 5A in accordance with one embodiment.

FIG. 6B illustrates various examples of primitive which would result in the "no" path from step 425 being followed.

Firstly, considering the patch 505, triangles such as 507 and 510 shown in FIG. 6B would be triangles of a type where the bounding box does not cover any of the grid points, but the bounding box is not entirely within a single sub-patch. Such triangles will be referred to herein as vertical triangles. Similarly, the patch 520 shows two example triangles 522, 525 which would also cause the no path to be followed from step 425, such triangles being referred to herein as horizontal triangles. Finally, the patch 515 illustrates various examples of triangle which would cause the no path from step 425 to be followed. In particular, all twelve of the example triangles shown in association with the patch 515 of FIG. 6B will have bounding boxes that do not cover any grid points of the patch, but where the bounding box is not entirely within a single sub-patch.

If at step 410 it is determined that the bounding box does cover at least one grid point of the patch, then the process proceeds to step 415, where it is determined whether there is any special grid point coverage condition present. The tests performed at this point in accordance with one embodiment are illustrated in FIG. 5C. In particular, at step 475 it is determined whether only a single grid point is covered by the bounding box, and that grid point is inherited from a previous subdivision. In particular, as will be appreciated from the earlier discussed FIG. 2A, whenever a patch is formed by subdivision, the grid points at the four corners of the new sub-patch will be inherited from grid points in the patch at the higher level of the multi-level patch analysis. Hence, each of the patches 225, 230, 235, 240 in FIG. 2A include, as their four corner grid points, grid points that are inherited from the patch 200.

Figure 6C:
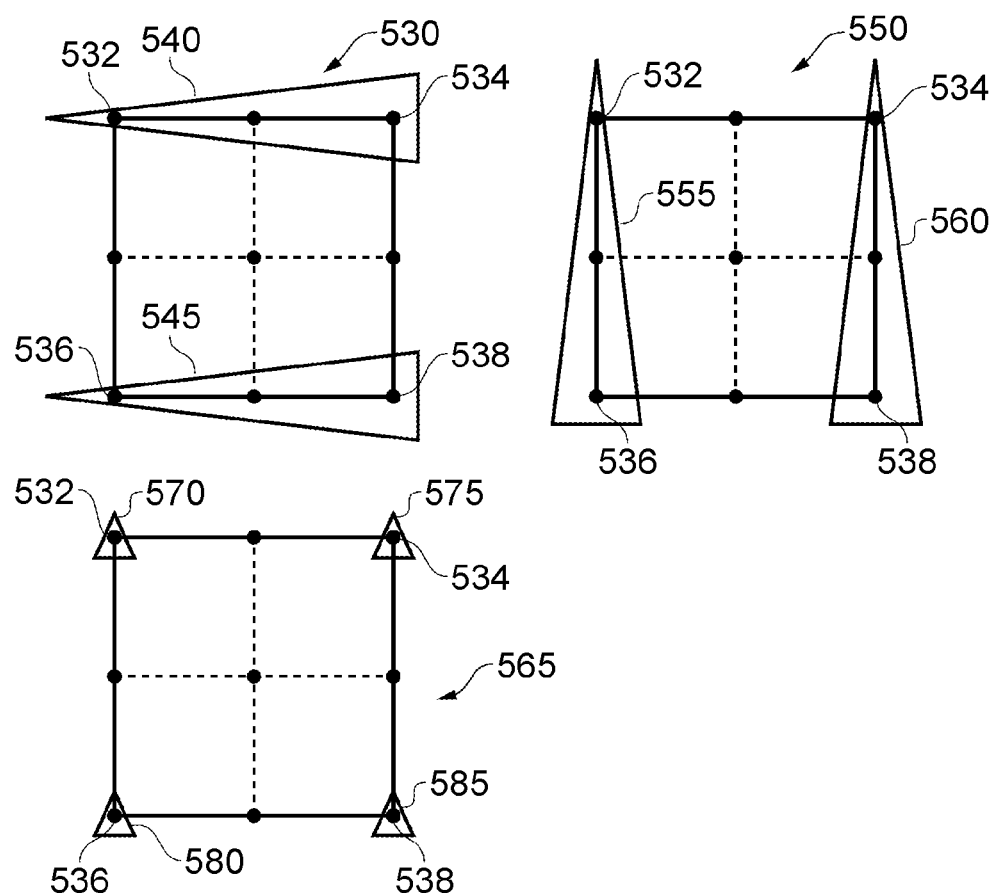
FIG. 6C illustrates some example primitives that will give rise to the performance of the optimised processing C at step 440 of FIG. 5A in accordance with one embodiment.

In FIG. 6C, the patch 565 illustrates four example triangles 570, 575, 580, 585 whose bounding box only covers a single grid point, and where the grid point covered has been inherited from a previous sub-division. In particular, assuming the patch 565 is not the initial patch at the first level of the multi-level patch analysis, each of the grid points 532, 534, 536, 538 will have been inherited from the patch at the previous level.

If the bounding box does only cover a single grid point, and that grid point has been inherited from a previous sub-division, then the processing proceeds to step 440, where optimised processing C is performed, the steps performed at this point being discussed later with reference to FIG. 7D. However, if the test at step 475 fails, a further test is performed at step 480, in order to determine whether the multiple grid points covered are all in one of the X direction or the Y direction, and the first and last grid points covered are inherited from the previous sub-division, thus meaning that the intervening grid point coverage can be inferred. Examples of triangles whose bounding box would meet this requirement are illustrated in FIG. 6C.

In particular, considering first the patch 530, the horizontal triangles 540, 545 will have bounding boxes that cover three grid points all aligned in the X direction, but where the first and last grid points 532, 534 for the triangle 540 and 536, 538 for the triangle 545 are inherited from the previous sub-division assuming that the patch 530 is not the initial patch at the first level of the multi-level patch analysis. Similarly, considering the patch 550 the two vertical triangles 555, 560 have bounding boxes that cover three grid points all aligned in the Y direction, and with the first and last grid points 532, 536 for the triangle 555 and 534, 538 for the triangle 560 inherited from the previous sub-division (assuming the patch 550 is not the initial patch at the first level of the multi-level patch analysis).

If the condition set out in step 480 is met, then again the process proceeds to step 440 where the optimised processing C is performed. Otherwise, the process proceeds to step 420 where normal processing is performed.

It will be understood that the example triangles shown in FIGS. 6A to 6C are merely intended to provide examples of primitives whose bounding boxes will meet the relevant tests discussed with reference to those figures, but that there will be a variety of other primitives (both different shaped triangles and non-triangle primitives) that will meet the discussed conditions for performing optimised processing stages A, B or C.

It will be appreciated that when processing the initial patch, if the bounding box of the primitive does cover one or more grid points, then the special grid points coverage condition cannot be detected at step 415 for the initial patch, since no grid points will have been inherited from a previous patch, and accordingly in that instance normal processing 420 will be performed for the initial patch. The steps performed in order to implement the normal processing step 420 will be discussed later with reference to FIG. 7A.

Figure 5A:
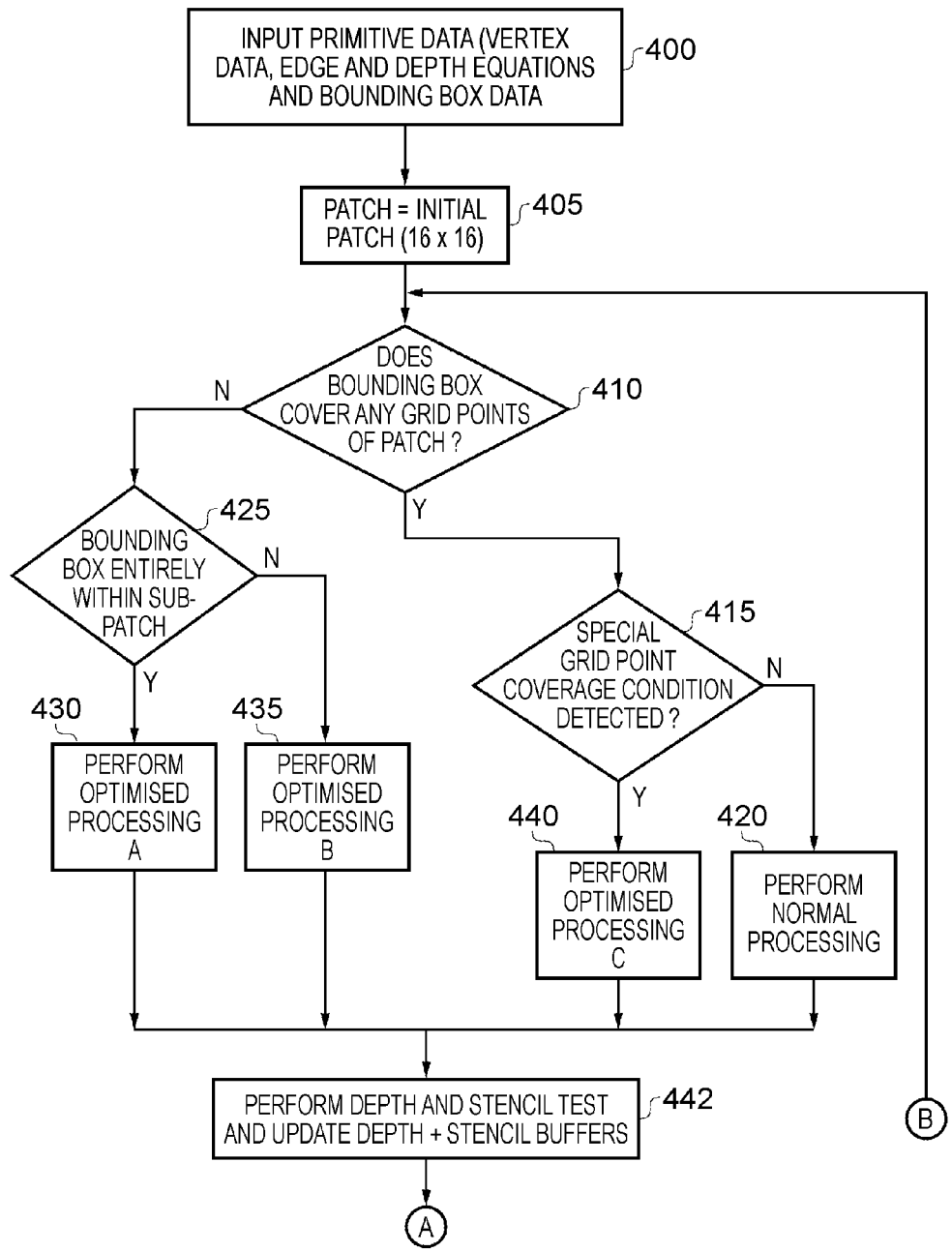
FIGS. 5A and 5B are a flow diagram illustrating the multi-level patch analysis process performed by the rasterizer in accordance with one embodiment.
Figure 5B:
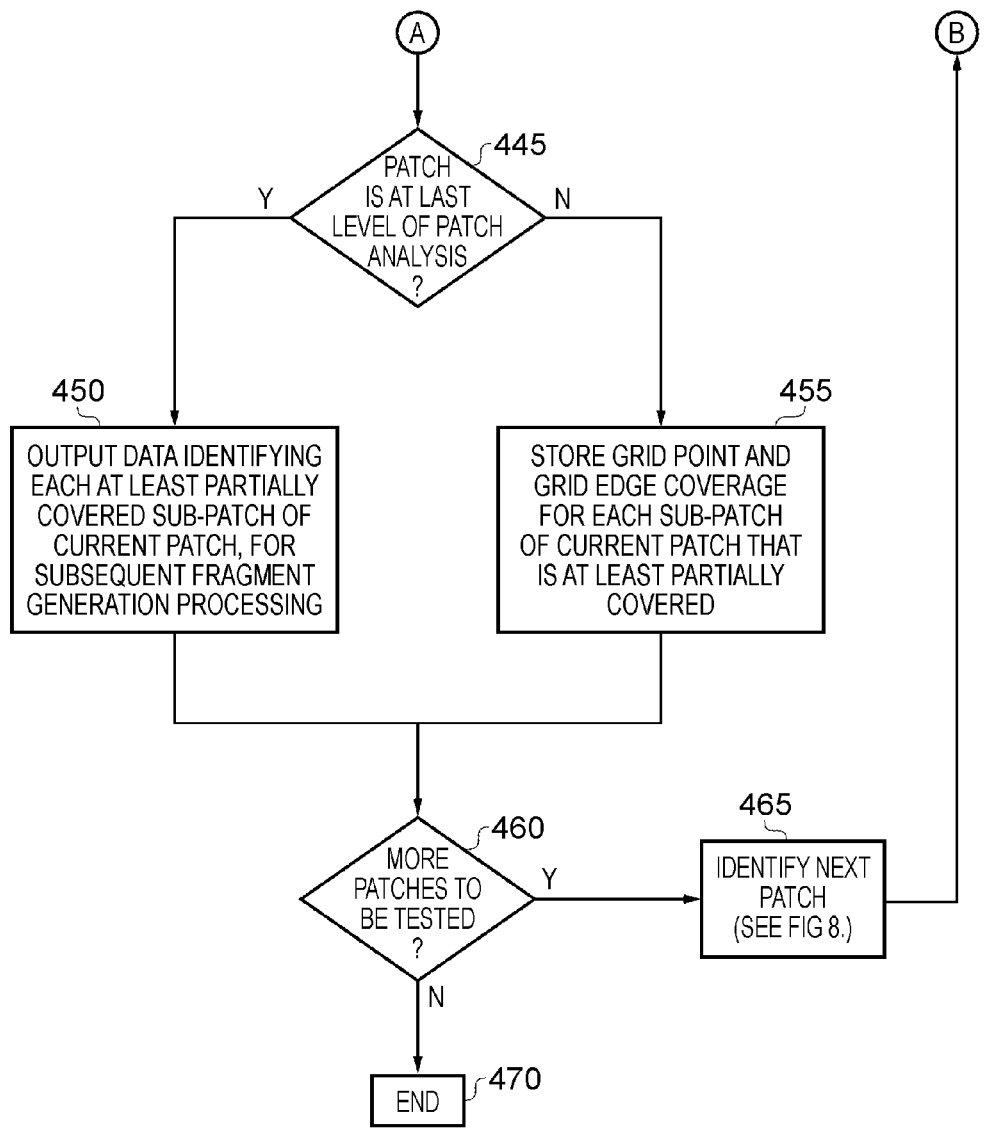
Figure 5C:
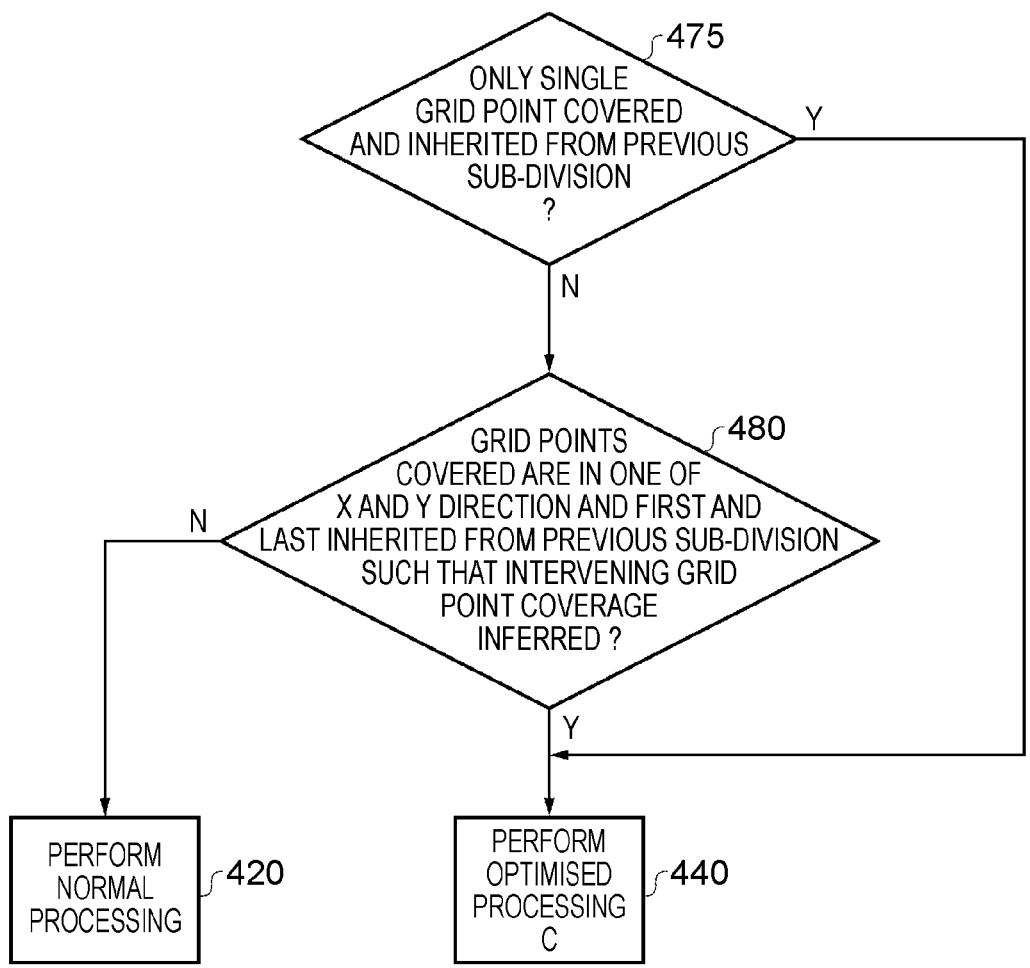
FIG. 5C is a flow diagram illustrating a sequence of steps that may be performed to determine the presence or absence of the special grid point coverage condition in order to implement step 415 of FIG. 5A in accordance with one embodiment.

Whichever of the processing stages 430, 435, 440, 420 are performed, the process of FIG. 5A then proceeds to step 442, where depth and stencil testing is performed in the standard manner, and depth and stencil buffers are updated. As will be appreciated by those skilled in the art, if the depth test is failed, this means that for the particular patch under consideration, the primitive currently being evaluated will not be displayed within the render output area corresponding to that patch, and accordingly further sub-division of that patch is not required.

Following step 442, the process proceeds to step 445, where it is determined whether the patch is at the last level of patch analysis. Returning to the example flow of FIG. 2B, this will be the case if the patch being considered is one of the 4×4 patches shown on the right-hand side of FIG. 2B. If the patch is at the last level of the patch analysis, then the process will proceed to step 450. At this point, it will be known for each of the four pixel quads forming sub-patches within the patch, which of those sub-patches are at least partially covered by the primitive. Accordingly, data is output at step 450 identifying each at least partially covered sub-patch of the current patch, with that data then being used for subsequent fragment generation processing. As a particular example, a bit mask can be output having a single bit value for each of the four sub-patches with the value being set to a first value (e.g. a logic one value) if the corresponding sub-patch is determined to at least partially be covered by the primitive, and with the value being set to a second value (e.g. a logic zero value) if the corresponding sub-patch is determined not to be covered by the primitive. The subsequent fragment generation processing is performed in a standard manner, and as will be understood by those skilled in the art, involves testing of the sampling points of each pixel within each pixel quad that is indicated as being at least partially covered by the primitive, in order to determine which sampling points are covered by the primitive, and then to generate one or more fragments dependent on the outcome of that evaluation.

If it is determined at step 445 that the patch is not at the last level of patch analysis, then a sub-division process will be required in order to consider patches at a lower level of the multi-level patch analysis. Accordingly, at step 455, grid point and grid edge coverage information for each sub-patch of the current patch that is at least partially covered is stored so that it can be referred to later when analysing patches at a lower level of the multi-level patch analysis. In addition to grid point and grid edge coverage information, depth value information for the various grid points can also be stored at this point.

Following steps 450 or 455, the process then proceeds to step 460 where it is determined whether there are more patches to be tested. If so, the process proceeds to step 465 where the next patch is identified, whereafter the process then returns to step 410. If at step 460, it is determined that all of the required patches have been tested, then the process ends at step 470. The process of FIGS. 5A to 5C can then be repeated for a next input primitive to be considered.

There are a number of ways in which the next patch to be processed can be identified at step 465. FIG. 8 illustrates one example sequence in which patches are analysed, the number inside each patch indicating its relative order within the sequence. Accordingly, following analysis of the 16×16 initial patch then the 8×8 patch identified by the number "2" will be tested next, provided it has been determined when analysing the sub-patches within the 16×16 patch that that patch will at least partially be covered. Once the 8×8 patch identified by the number "2" has been evaluated, then the next patch that will be identified for processing will be the 4×4 patch identified by the number "3", again assuming it has been determined that that patch is at least partially covered by the primitive.

Accordingly, it will be appreciated that the basic ordering shown in FIG. 8 will be adopted unless, when analysing the patch at a previous level of the analysis, it was determined that that patch will not be covered by the primitive, or indeed if another test identified that there was no need to further sub-divide and consider a patch, for example if the earlier-mentioned depth test performed at step 442 fails.

Figure 7A:
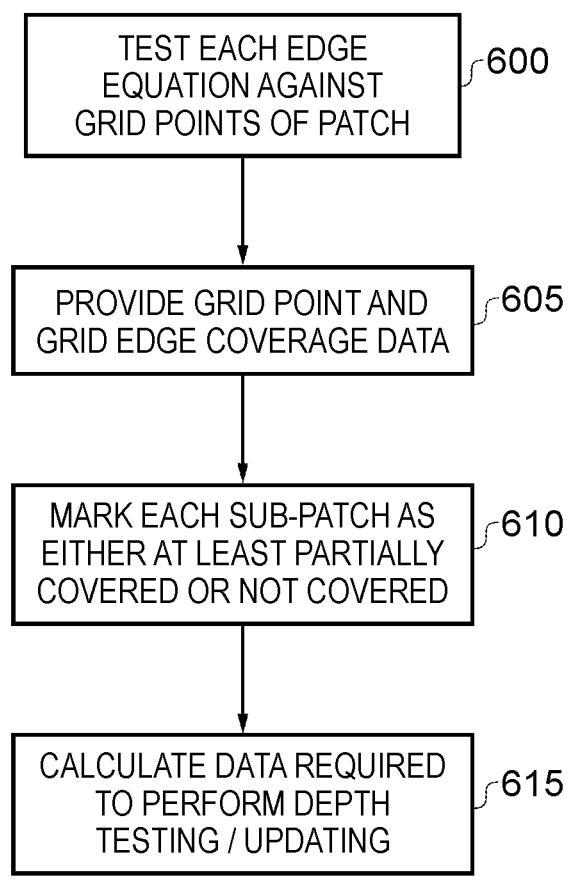
FIG. 7A is a flow diagram illustrating some steps performed at step 420 of FIG. 5A in accordance with one embodiment.

FIG. 7A illustrates the normal processing performed at step 420 assuming it has been determined that the optimised processing of either steps 430, 435 or 440 cannot be performed. At step 600, the grid points of the patch are tested against each of the edge equations. For a triangle, there will be three edge equations, and hence it will typically take three cycles to perform such testing. As a result of the testing performed at step 600, grid point and grid edge coverage data is produced at step 605 identifying which grid points fall within the primitive, and which grid edges (i.e. the edges between adjacent grid points) cross an edge of the primitive. On the basis of this grid point and grid edge coverage data, each of the four sub-patches within a patch are marked as either partially covered or not covered at step 610.

At step 615, the data required to perform depth testing and updating is calculated for the at least partially covered sub-patches. There are a number of ways in which this data can be calculated, but in one embodiment this is achieved by calculating the depth value at each grid point, this being performed with reference to the depth equation input at step 400, and accordingly typically taking a further clock cycle to perform. Typically, the depth values generated for each grid point will then be clamped so they do not exceed the minimum or maximum depth value of the primitive (as determined from the Z co-ordinate data provided for each vertex of the primitive). Then, for each of the four sub-patches, the minimum and maximum depth values may be determined based on the depth values found for the four grid points defining the corners of the sub-patch. Whilst in principle step 615 only needs to be performed for each sub-patch which is marked at step 610 as being at least partially covered, it is often the case that this processing is performed in a pipelined manner, and that the depth value evaluation process of step 615 is performed at least partly in parallel with the edge equation testing process of step 600, 605, 610. Accordingly, in one embodiment the depth value evaluation is performed for each of the sub-patches.

Figure 7B:
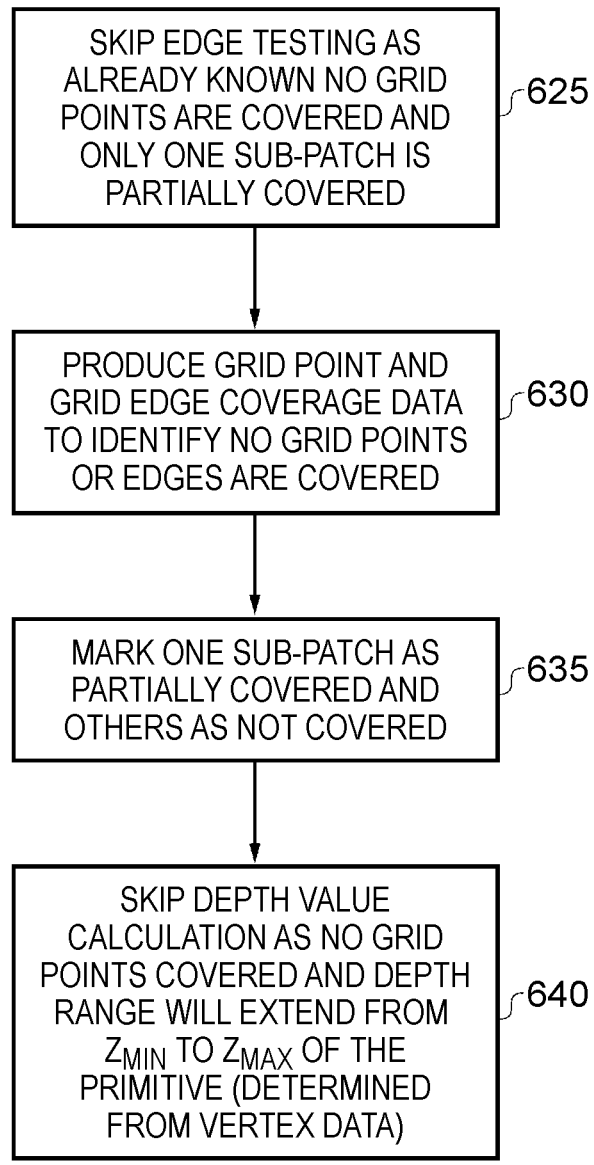
FIG. 7B is a flow diagram illustrating some steps performed at step 430 of FIG. 5A in accordance with one embodiment.

FIG. 7B is a flow diagram illustrating the steps performed to implement optimised processing A 430 of FIG. 5A. At step 625, edge testing is skipped, as it is already known that no grid points are covered and only one sub-patch is partially covered, this information being known by virtue of the evaluation performed at step 410 and 425 with reference to the bounding box.

At step 630, the grid point and grid edge coverage data can hence be produced in order to identify that no grid points and no grid edges are covered. At step 635, the one sub-patch that is known to be partially covered is marked as partially covered, and the other sub-patches are marked as not covered. Because no testing of the edge equations is required, the steps 625, 630 and 635 can typically be performed in a single cycle, thus yielding a significant performance gain when compared with the typical three cycles required to perform steps 600, 605 and 610 in accordance with normal processing.

Further, the depth value calculation process (or equivalent process used to determine the data required for depth testing/updating) can be skipped since no grid points are covered, and the depth range is known to extend only from the $Z_{min}$ to $Z_{max}$ values of the primitive (as determined from the vertex data). Hence, the cycle normally required to perform depth value evaluation in accordance with normal processing can also be saved.

Figure 7C:
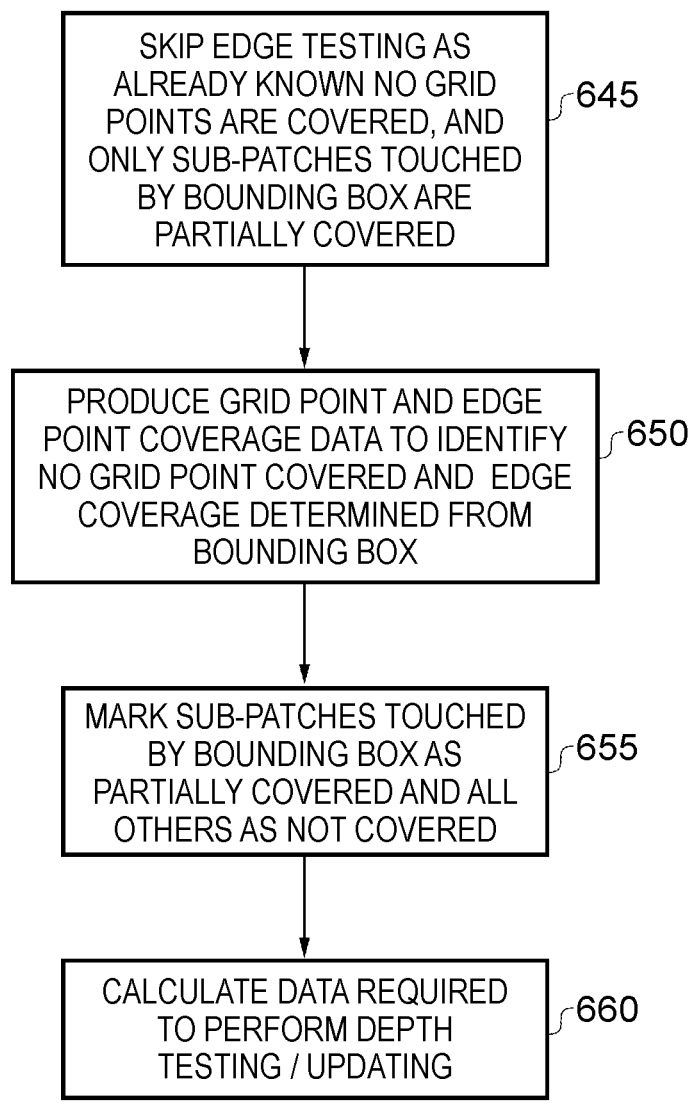
FIG. 7C is a flow diagram illustrating some steps performed at step 435 of FIG. 5A in accordance with one embodiment.

FIG. 7C illustrates the steps performed to implement optimised processing B 435 of FIG. 5A in accordance with one embodiment. At step 645, edge testing is skipped as it is already known that no grid points are covered, and that only the sub-patches touched by the bounding box are partially covered. Accordingly, at step 650, the grid point and edge point coverage data can be produced without any edge testing being required, and in particular will identify that no grid points are covered, and will identify the edge coverage data as determined directly from the bounding box evaluation. At step 655 the sub-patches touched by the bounding box are marked as partially covered and all other sub-patches are marked as not covered. Accordingly, when compared with the edge testing process required in accordance with the normal processing, the same performance benefits can be achieved as discussed earlier when discussing optimised processing A.

However, since the primitive does cross at least one grid edge, it is appropriate to calculate data indicative of the depth value for at least those grid points separated by a crossed grid edge. In practice, at step 660, the data required to perform depth testing and updating will be calculated for all of the at least partially covered sub-patches, for example by calculating the depth value for each grid point, and accordingly the process performed at step 660 will correspond to the process performed at the earlier described step 615 of FIG. 7A. Step 660 could be performed only in relation to the sub-patches that are determined to be partially covered if that information is available by the time step 660 is performed, but in one embodiment that step is performed for each sub-patch in order to allow the optimised processing steps to be performed at least partially in parallel within a pipelined processor arrangement.

Figure 7D:
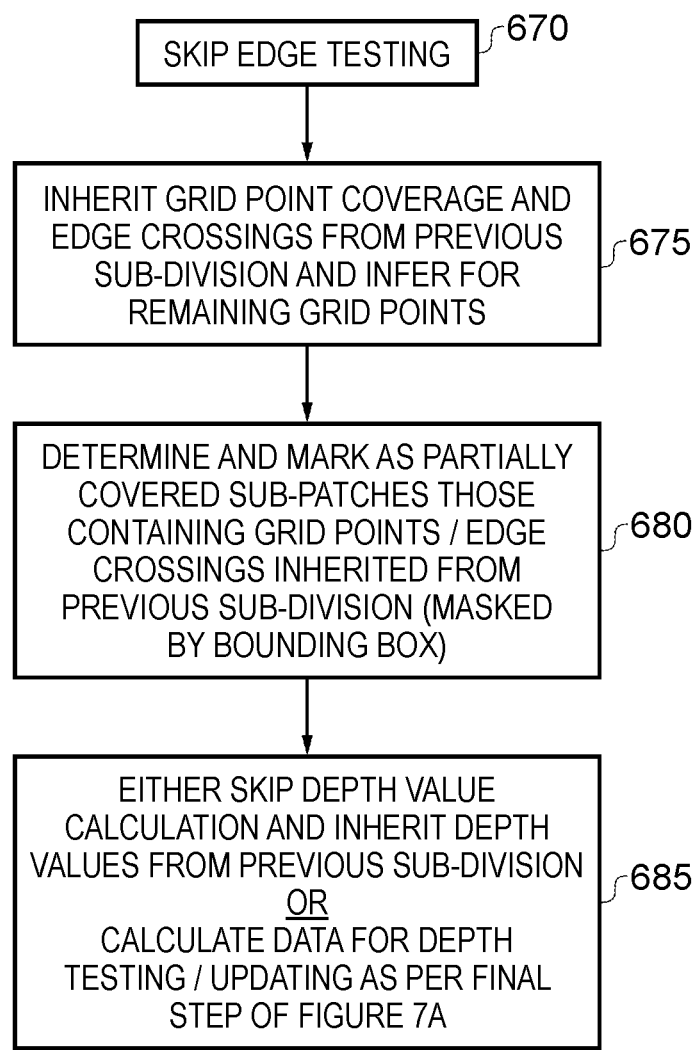
FIG. 7D is a flow diagram illustrating some steps performed at step 440 of FIG. 5A in accordance with one embodiment.

FIG. 7D illustrates the steps performed to implement optimised processing C 440 of FIG. 5A in accordance with one embodiment. At step 670, edge testing is again skipped, since in this instance it is known that both the grid point coverage and the edge coverage can be inherited from the previous sub-division. Accordingly, rather than testing the edge equations, at step 675 the grid point coverage and edge crossings are inherited from the previous sub-division, and are then inferred for the remaining grid points. Considering the example of FIG. 6C, if the example of the triangle 575 overlapping the grid point 534 is considered, the grid point coverage for grid point 534 will be inherited from the previous sub-division, and will identify that that grid point falls within the primitive. Similarly, grid points 532, 536 and 538 will have their grid point coverage information inherited and this will identify that those grid points are outside of the primitive. It can be inferred that all of the remaining five grid points are also outside of the primitive. Similarly, the two grid edges touching the grid point 534 can be marked to identify that those edges are crossed by the primitive, whilst all other grid edges can be inferred as not being crossed.

Similarly, considering the example of the triangle 540 shown in FIG. 6C, the grid point coverage for grid points 532 and 534 will be inherited and will identify that those grid points are covered by the primitive. For the grid point lying between grid points 532 and 534 in the horizontal direction, it can also be inferred that that grid point will be covered by the primitive. Grid points 536, 538 will inherit the grid point coverage from the previous level, and will be identified as not being covered, and the remaining four grid points can also be inferred as not being covered. The grid edge information can also be inherited from the previous sub-division, or inferred from the inherited information.

At step 680, it is determined that the partially covered sub-patches are those containing grid points and edge crossings inherited from the previous sub-division, as masked by the bounding box. Hence, considering again the example of the triangle 540 in FIG. 6C, the upper two sub-patches of the patch 530 will be identified as partially covered, but the lower two sub-patches will not since, even though the grid point coverage information for grid points 536 and 538 can be inherited from the previous sub-division, those grid points will not be within the bounding box.

In one embodiment, the depth value calculation can be skipped and instead the depth values can be inherited from the previous sub-division. Whilst this will be sufficient in many instances, there will be some rare cases where better precision will be obtained if that calculation is performed again. Accordingly, if desired, the data required for depth testing can be calculated at step 685 as per step 615 of FIG. 7A. Accordingly, since edge testing is skipped, significant performance benefits can be realised when performing the optimised processing C 440 instead of the normal processing 420. Further performance and/or power consumption benefits are also obtained if the depth value calculation is skipped.

As will be apparent from the above discussion of FIGS. 7A to 7D, in certain situations the depth value calculation process can be skipped. Further, whichever of the processing stages 430, 435, 440, 420 are performed, when subsequently performing the depth testing and updating at step 442 it is possible in some instance to skip the depth testing. If the depth testing is skipped, the update process is still performed.

In particular, when performing depth testing of a patch at a particular level, the depth testing is effectively performed for each of the sub-patches of that patch, which will result in those sub-patches being marked as either passing, failing, or being unknown (i.e. it is not known whether that sub-patch passes or fails the depth test). During subdivision, any patches that are marked as passed or unknown will typically become selected patches for processing at that next subdivision level, but those marked as failed do not need to be processed at that next subdivision level. In one embodiment, for a sub-patch that is marked as having passed the depth test, then when it is treated as a selected patch at the next subdivision level, depth testing of that selected patch can be skipped at step 442 since the result is known, and instead the depth buffer can merely be updated.

FIGS. 9A and 9B schematically illustrate the edge testing process performed by steps 600 and 605 of FIG. 7A. In FIG. 9A, a triangle 700 is shown imposed upon a particular patch consisting of an array of nine grid points. A first edge 705 is evaluated first, by testing each grid point against the associated edge equation in order to determine whether that grid point is inside or outside of the edge equation. By inserting the X and Y co-ordinates of each grid point into the edge equation, this will produce either a negative value or a positive value. In one embodiment, grid points having a negative value will be outside of the edge, whilst those having a positive value will be inside of the edge. As shown in FIG. 9A, when considering the first edge 705, the six grid points shown in solid form in the lower half of the 3×3 array are found to be inside of the edge. This process is repeated for the second edge 710, resulting in the four grid points marked in solid form as being inside of the edge, and then is again repeated for the final edge 715. In respect of the final edge all nine grid points are considered to be inside the edge. As also shown in FIG. 9A, the process identifies grid edges that are covered, i.e. grid edges that are crossed by the edge of a primitive. When evaluating the first edge 705, one grid edge is identified as being crossed, whilst when evaluating the second edge 710 two edges are identified as crossed. No edges are crossed by the third edge 715 of the primitive. All grid-points are subjected to a logical AND operation for all of the edges of the primitive, whilst the crossed grid edges are subjected to a logical OR operation such that a result of the operation is as illustrated in FIG. 9B. In particular, there is only a single grid point 720 that is contained within the primitive, and three grid edges 725, 730, 735 that are determined to be crossed by the edges of the primitive.

Using this information, step 610 of FIG. 7A can then be performed in order to identify the two right-hand sub-patches as being at least partially covered and the two left-hand side sub-patches as not being covered.

From the above described embodiments, it will be appreciated that such embodiments enable a significant increase in the performance of the multi-level patch analysis performed by the rasterizer during the rasterising of input primitives in order to generate graphics fragments to be processed by a rendering stage. The performance benefits realised can be particularly advantageous when processing small primitives that occupy only a relatively small area within the render output area.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive:

determining from the vertex data a bounding box for the input primitive;

performing a multi-level patch analysis in order to determine patches covered at least partially by the input primitive, at a first level the render output area being divided into one or more patches, and at each subsequent level the render output area being divided into a plurality of patches smaller than the patches of the preceding level;

each patch having an array of grid points defining boundaries of a set of sub-patches within that patch;

at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;

for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive;

when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of said default operation, said alternative operation determining whether the primitive at least partially covers any of the sub-patches of the selected patch without testing the grid points of the selected patch against the at least one edge equation of the primitive, wherein:

said bounding box evaluation step determines existence of said special condition if the bounding box does not cover any of the grid points in the array of grid points, and the bounding box is contained entirely within a single sub-patch;

each input primitive has a depth equation associated therewith;

the default operation further comprises performing a depth calculation operation using the depth equation of the primitive in order to determine a depth range for each sub-patch; and in the event of said special condition being detected, said alternative operation further comprises determining the depth range without performing said depth calculation operation.

2. A method as claimed in claim 1, wherein on detection of said special condition said alternative operation comprises marking the single sub-patch containing the bounding box as partially covered and marking all other sub-patches of the selected patch as not covered.

3. A method as claimed in claim 1, wherein:
said default operation uses data generated by the testing of the grid points of the selected patch against the at least one edge equation in order to determine grid point coverage information for each grid point in the array and grid edge coverage information for each grid edge between adjacent grid points in the array in order to identify grid points and grid edges covered by the input primitive; and
on detection of said special condition said alternative operation determines the grid point coverage information and grid edge coverage information to identify that no grid points and no grid edges are covered by the input primitive.

4. A method as claimed in claim 1, wherein said alternative operation determines the depth range from the depth values associated with each vertex of the input primitive.

5. A method as claimed in claim 1, wherein:
at each level the patch analysis further comprises performing a depth testing and update operation, and if for a current selected patch the equivalent sub-patch at the preceding level of the patch analysis passed the depth testing and update operation, the patch analysis skips the depth testing part of the depth testing and update operation.

6. A method as claimed in claim 1, wherein said step of determining from the vertex data a bounding box for the input primitive comprises:
determining minimum and maximum X and Y values from the vertex data;
snapping said minimum and maximum X and Y values out to the boundaries of the nearest sub-patch associated with the final level of the patch analysis in order to determine the boundaries of the bounding box so as to ensure that all pixel sampling points for pixels within the primitive are covered by the bounding box.

7. A method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive:
determining from the vertex data a bounding box for the input primitive;
performing a multi-level patch analysis in order to determine patches covered at least partially by the input primitive, at a first level the render output area being divided into one or more patches, and at each subsequent level the render output area being divided into a plurality of patches smaller than the patches of the preceding level;
each patch having an array of grid points defining boundaries of a set of sub-patches within that patch;
at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;
for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and
generating one or more graphics fragments for at least each sub-patch of the final level of the patch analysis determined to be covered at least partially by the primitive;
when performing patch analysis of a selected patch, performing a bounding box evaluation step to determine if a special condition exists where the bounding box does not cover any of the grid points in the array of grid points, and, in the presence of said special condition, adopting an alternative operation for that selected patch instead of said default operation, said alternative operation determining whether the primitive at least partially covers any of the sub-patches of the selected patch without testing the grid points of the selected patch against the at least one edge equation of the primitive;
wherein said bounding box evaluation step determines existence of said special condition if the bounding box does not cover any of the grid points in the array of grid points, and the bounding box crosses only one of grid edges extending in a first direction between the grid points and grid edges extending in a second direction between the grid points, the second direction being orthogonal to the first direction.

8. A method as claimed in claim 7, wherein on detection of said special condition said alternative operation comprises marking each sub-patch of the selected patch that is touched by the bounding box as partially covered, and marking all other sub-patches of the selected patch as not covered.

9. A method as claimed in claim 7, wherein:
said default operation uses data generated by the testing of the grid points of the selected patch against the at least one edge equation in order to determine grid point coverage information for each grid point in the array and grid edge coverage information for each grid edge between adjacent grid points in the array in order to identify grid points and grid edges covered by the input primitive; and
on detection of said special condition said alternative operation determines the grid point coverage information and grid edge coverage information to identify that no grid points are covered by the input primitive and to use the bounding box to determine which grid edges are covered by the input primitive.

10. A method of performing rasterisation in a graphics processing system that includes a rasterisation stage for rasterising input primitives to generate graphics fragments to be processed by a rendering stage in order to generate output data for display in a render output area, each input primitive specifying vertex data, and having at least one edge equation associated therewith, the method comprising for each input primitive:

determining from the vertex data a bounding box for the input primitive;

performing a multi-level patch analysis in order to determine patches covered at least partially by the input primitive, at a first level the render output area being divided into one or more patches, and at each subsequent level the render output area being divided into a plurality of patches smaller than the patches of the preceding level;

each patch having an array of grid points defining boundaries of a set of sub-patches within that patch;

at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;

for any selected patch for which it is determined that the primitive at least partially covers any of the sub-patches of that patch, and assuming the final level of the patch analysis has not been reached, the patch analysis further comprising sub-dividing that selected patch into the set of sub-patches, and for each sub-patch that the primitive at least partially covers, treating that sub-patch as a selected patch to be analysed at the next level of the patch analysis; and generating one or more graphics fragments for at least each sub-patch of the final level of the patch analysis determined to be covered at least partially by the primitive;

when performing patch analysis of a selected patch, performing a bounding box evaluation step to determine if a special grid point coverage condition exists, and, in the presence of said special grid point coverage condition, adopting an alternative operation for that selected patch instead of said default operation, said alternative operation determining whether the primitive at least partially covers any of the sub-patches of the selected patch without testing the grid points of the selected patch against the at least one edge equation of the primitive, wherein:

each input primitive has a depth equation associated therewith;

the default operation further comprises performing a depth calculation operation using the depth equation of the primitive in order to determine a depth range for each sub-patch; and in the event of said special grid point coverage condition being detected, said alternative operation further comprises determining the depth range without performing said depth calculation operation.

11. A method as claimed in claim 10, wherein said bounding box evaluation step determines existence of said special grid point coverage condition if only a single grid point is covered by the bounding box, and that single grid point matches a grid point of a patch at a previous level of the patch analysis.

12. A method as claimed in claim 11, wherein said alternative operation is configured to inherit grid point coverage information from the patch at the previous level for grid points matching grid points of the patch at the previous level of the patch analysis, and to mark as partially covered the sub-patch that includes both a grid point that has inherited grid point coverage information from the patch at the previous level and which is touched by the bounding box.

13. A method as claimed in claim 10, wherein said bounding box evaluation step determines existence of said special grid point coverage condition if multiple grid points are covered by the bounding box, those multiple grid points are extending in one of an X direction and a Y direction through the grid array, and a first and a last of the covered multiple grid points match a grid point of a patch at a previous level of the patch analysis.

14. A method as claimed in claim 13, wherein said alternative operation is configured to inherit grid point coverage information from the patch at the previous level for grid points matching grid points of the patch at the previous level of the patch analysis, and to mark as a partially covered those sub-patches that includes both a grid point that has inherited grid point coverage information from the patch at the previous level and which is touched by the bounding box.

15. A method as claimed in claim 10, wherein:

said default operation uses data generated by the testing of the grid points of the selected patch against the at least one edge equation in order to determine grid point coverage information for each grid point in the array and grid edge coverage information for each grid edge between adjacent grid points in the array in order to identify grid points and grid edges covered by the input primitive; and on detection of said special grid point coverage condition said alternative operation determines the grid point coverage information and grid edge coverage information by inheriting grid point and grid edge coverage information for grid points and grid edges matching grid points and grid edges of the patch at the previous level of the patch analysis, and by inferring the grid point and grid edge coverage values for the remaining grid points and grid edges.

16. A method as claimed in claim 10, wherein said alternative operation determines the depth range by inheriting depth range information for grid points matching grid points of the patch at the previous level of the patch analysis.

17. A graphics processing system comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising:

bounding box determination circuitry configured to determine, from the vertex data of each input primitive, a bounding box for that input primitive;

patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level;

each patch having an array of grid points defining boundaries of a set of sub-patches within that patch;

at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;

for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive;

the patch analysis circuitry being further configured, when performing patch analysis of a selected patch, to perform a bounding box evaluation step to determine if a special condition exists where the bounding box does not cover any of the grid points in the array of grid points, and in the presence of said special condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive;

wherein said bounding box evaluation step determines existence of said special condition if the bounding box does not cover any of the grid points in the array of grid points, and the bounding box is contained entirely within a single sub-patch;

wherein:

each input primitive has a depth equation associated therewith;

the default operation further comprises performing a depth calculation operation using the depth equation of the primitive in order to determine a depth range for each sub-patch; and in the event of said special condition being detected, said alternative operation further comprises determining the depth range without performing said depth calculation operation.

18. A graphics processing system comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising:

bounding box determination circuitry configured to determine, from the vertex data of each input primitive, a bounding box for that input primitive;

patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level;

each patch having an array of grid points defining boundaries of a set of sub-patches within that patch;

at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;

for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive;

the patch analysis circuitry being further configured, when performing patch analysis of a selected patch, to perform a bounding box evaluation step to determine if a special grid point coverage condition exists, and in the presence of said special grid point coverage condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive;

wherein:

each input primitive has a depth equation associated therewith;

the default operation further comprises performing a depth calculation operation using the depth equation of the primitive in order to determine a depth range for each sub-patch; and in the event of said special grid point coverage condition being detected, said alternative operation further comprises determining the depth range without performing said depth calculation operation.

19. A graphics processing system comprising rasterising circuitry configured to perform rasterisation of input primitives in order to generate graphics fragments to be processed by rendering circuitry in order to generate output data for display in a render output area, each input primitive specifying vertex data, and having at least one edge equation associated therewith, the system comprising:

bounding box determination circuitry configured to determine, from the vertex data of each input primitive, a bounding box for that input primitive;

patch analysis circuitry configured, for each input primitive, to perform a multi-level patch analysis in order to determine patches covered at least partially by the input primitive, at a first level the render output area being divided into one or more patches, and at each subsequent level the render output area being divided into a plurality of patches smaller than the patches of the preceding level;

each patch having an array of grid points defining boundaries of a set of sub-patches within that patch;

at each level the patch analysis comprising, for each of one or more selected patches at that level, performing as a default operation testing of the grid points of the selected patch against the at least one edge equation of the primitive to determine whether the primitive at least partially covers any of the sub-patches of that selected patch;

for any selected patch for which it is determined that the primitive at least partially covers any of the sub-patches of that patch, and assuming the final level of the patch analysis has not been reached, the patch analysis circuitry being further configured to sub-divide that selected patch into the set of sub-patches, and for each sub-patch that the primitive at least partially covers, to treat that sub-patch as a selected patch to be analysed at the next level of the patch analysis; and graphics fragment generating circuitry configured to generate one or more graphics fragments for at least each sub-patch of the final level of the patch analysis determined to be covered at least partially by the primitive;

the patch analysis circuitry being further configured, when performing patch analysis of a selected patch, to perform a bounding box evaluation step to determine if a special condition exists where the bounding box does not cover any of the grid points in the array of grid points, and in the presence of said special condition the patch analysis circuitry being configured to adopt an alternative operation for that selected patch instead of said default operation, said alternative operation being configured to determine whether the primitive at least partially covers any of the sub-patches of the selected patch without testing the grid points of the selected patch against the at least one edge equation of the primitive;

wherein said bounding box evaluation step determines existence of said special condition if the bounding box does not cover any of the grid points in the array of grid points, and the bounding box crosses only one of grid edges extending in a first direction between the grid points and grid edges extending in a second direction between the grid points, the second direction being orthogonal to the first direction.

* * * * *